(12) United States Patent
Kurasawa et al.

(10) Patent No.: US 9,857,905 B2
(45) Date of Patent: *Jan. 2, 2018

(54) SENSOR-EQUIPPED DISPLAY DEVICE

(71) Applicant: Japan Display Inc., Tokyo (JP)

(72) Inventors: Hayato Kurasawa, Tokyo (JP);
Hiroshi Mizuhashi, Tokyo (JP);
Yoshitoshi Kida, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,137

(22) Filed: Mar. 9, 2017

(65) Prior Publication Data

US 2017/0177134 A1    Jun. 22, 2017

Related U.S. Application Data

(63) Continuation of application No. 14/802,102, filed on Jul. 17, 2015, now Pat. No. 9,626,056.

(30) Foreign Application Priority Data

Jul. 18, 2014    (JP) .................................. 2014-147440

(51) Int. Cl.
*G06F 3/041*    (2006.01)
*G06F 3/044*    (2006.01)
(Continued)

(52) U.S. Cl.
CPC ........ *G06F 3/0412* (2013.01); *G02F 1/13338* (2013.01); *G02F 1/134309* (2013.01);
(Continued)

(58) Field of Classification Search
CPC . G06F 2203/04112; G06F 2203/04103; G06F 3/044; G06F 3/047
See application file for complete search history.

(56) References Cited

U.S. PATENT DOCUMENTS 9,626,056 B2 *    4/2017    Kurasawa ............... G06F 3/044
2007/0257894 A1    11/2007    Philipp
(Continued)

FOREIGN PATENT DOCUMENTS

JP    2007-299409 A    11/2007
JP    2009-244958 A    10/2009

*Primary Examiner* — Abbas Abdulselam
(74) *Attorney, Agent, or Firm* — K&L Gates LLP

(57) ABSTRACT

A sensor-equipped display device is provided. The sensor-equipped display device includes a display panel comprising a common electrode; a sensor comprising a plurality of detection electrodes extending in a first direction and arranged in a second direction crossing the first direction, each of the detection electrodes including a first electrode and a second electrode which are opposed to the common electrode, are divided and extend in the first direction, each of the first electrode and the second electrode including a gradient in width in the first direction in the detection electrode, the gradient in width of the first electrode and the gradient in width of the second electrode being inclined in opposite directions; and a controller configured to effect switching to either a first mode or a second mode, and to control driving of the common electrode and the detection electrodes, wherein the sensor further comprises a dummy electrode disposed between neighboring detection electrodes.

11 Claims, 16 Drawing Sheets

(51) Int. Cl.
*G02F 1/1333* (2006.01)
*G02F 1/1343* (2006.01)

(52) U.S. Cl.
CPC ............ *G06F 3/044* (2013.01); *G06F 3/0416* (2013.01); *G02F 2201/121* (2013.01); *G02F 2201/123* (2013.01); *G06F 2203/04107* (2013.01); *G06F 2203/04108* (2013.01)

(56) References Cited

U.S. PATENT DOCUMENTS

| | | |
|---|---|---|
| 2009/0179868 A1 | 7/2009 | Ayres et al. |
| 2010/0182273 A1 | 7/2010 | Noguchi et al. |
| 2014/0218309 A1 | 8/2014 | Park |
| 2015/0029148 A1 | 1/2015 | Wang et al. |
| 2015/0049260 A1 | 2/2015 | Yashiro et al. |
| 2015/0242025 A1* | 8/2015 | Cok ........................ G06F 3/046 29/622 |
| 2016/0085339 A1* | 3/2016 | Yashiro ................... G06F 3/044 345/174 |
| 2016/0253030 A1* | 9/2016 | Tada ........................ G06F 3/041 |

\* cited by examiner

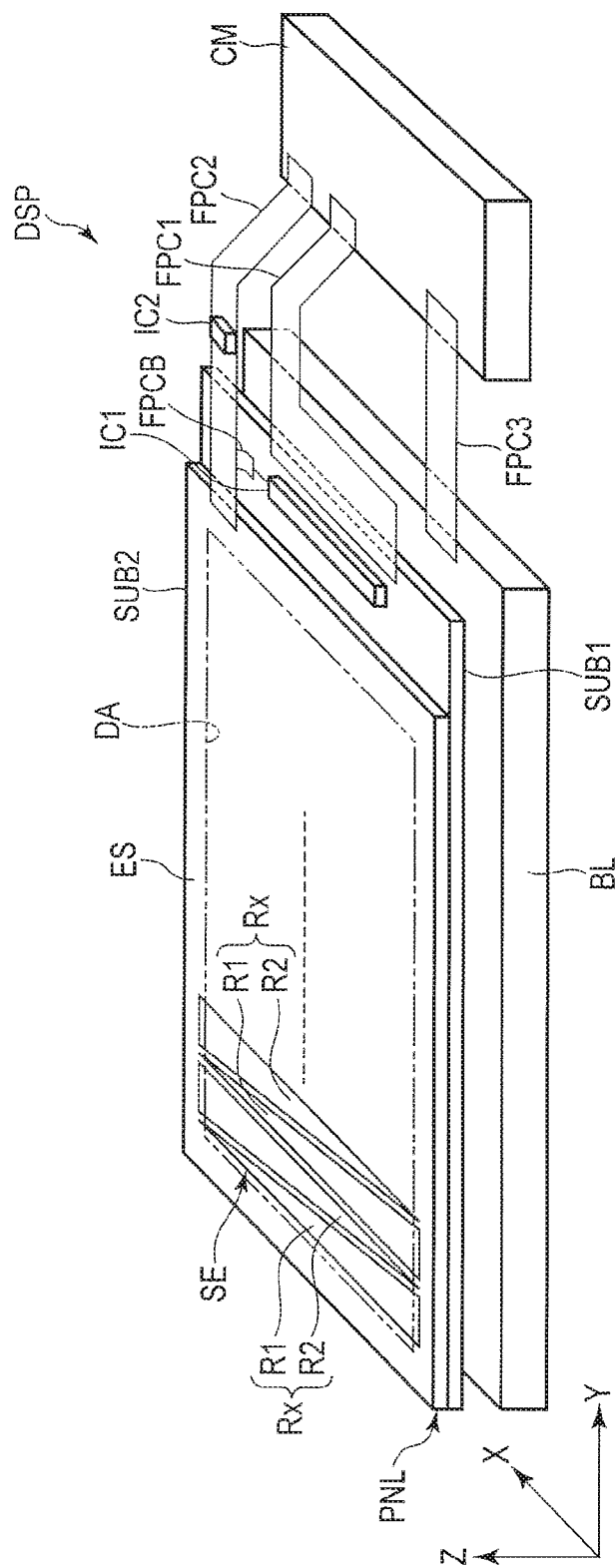
F I G. 1

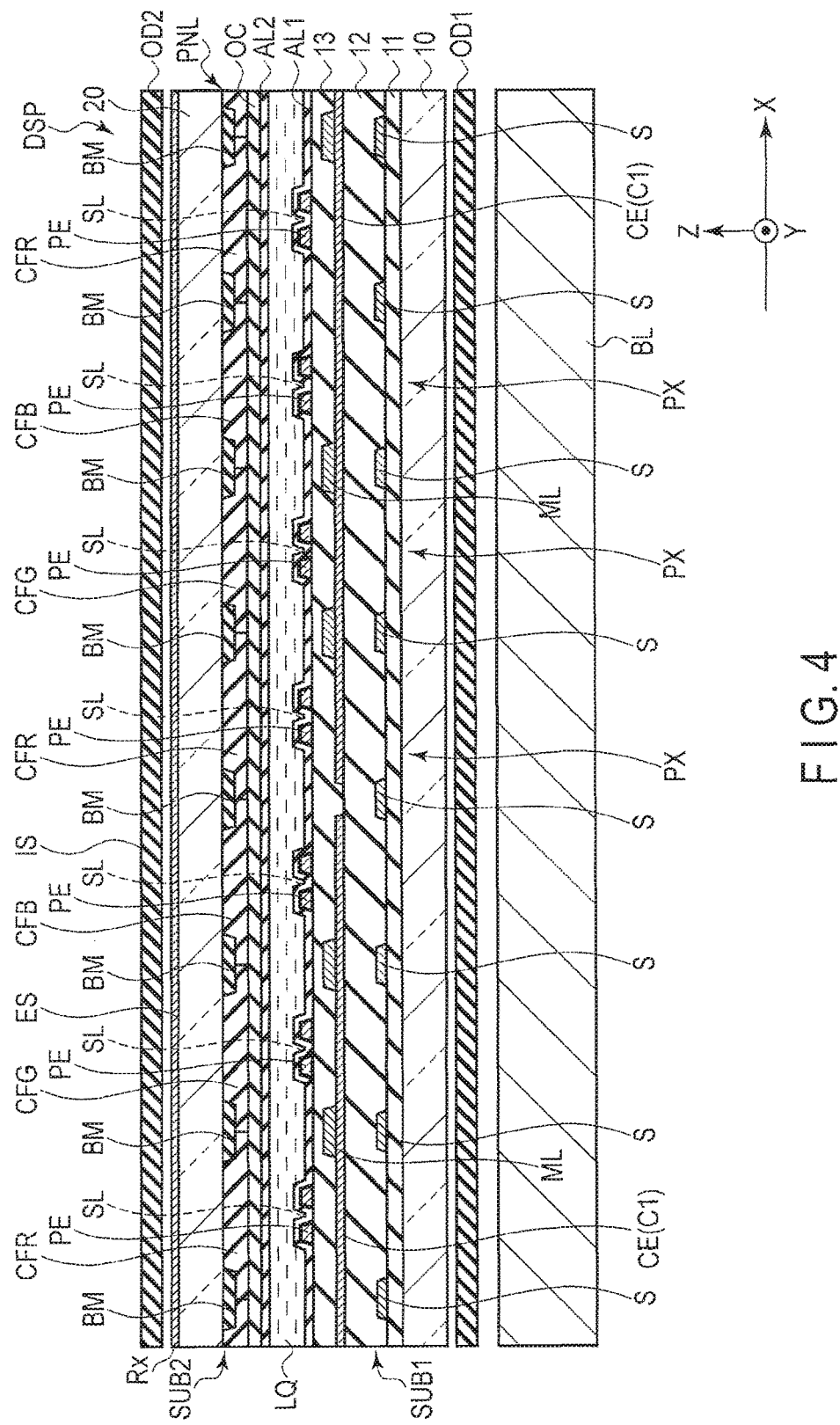
F I G. 4

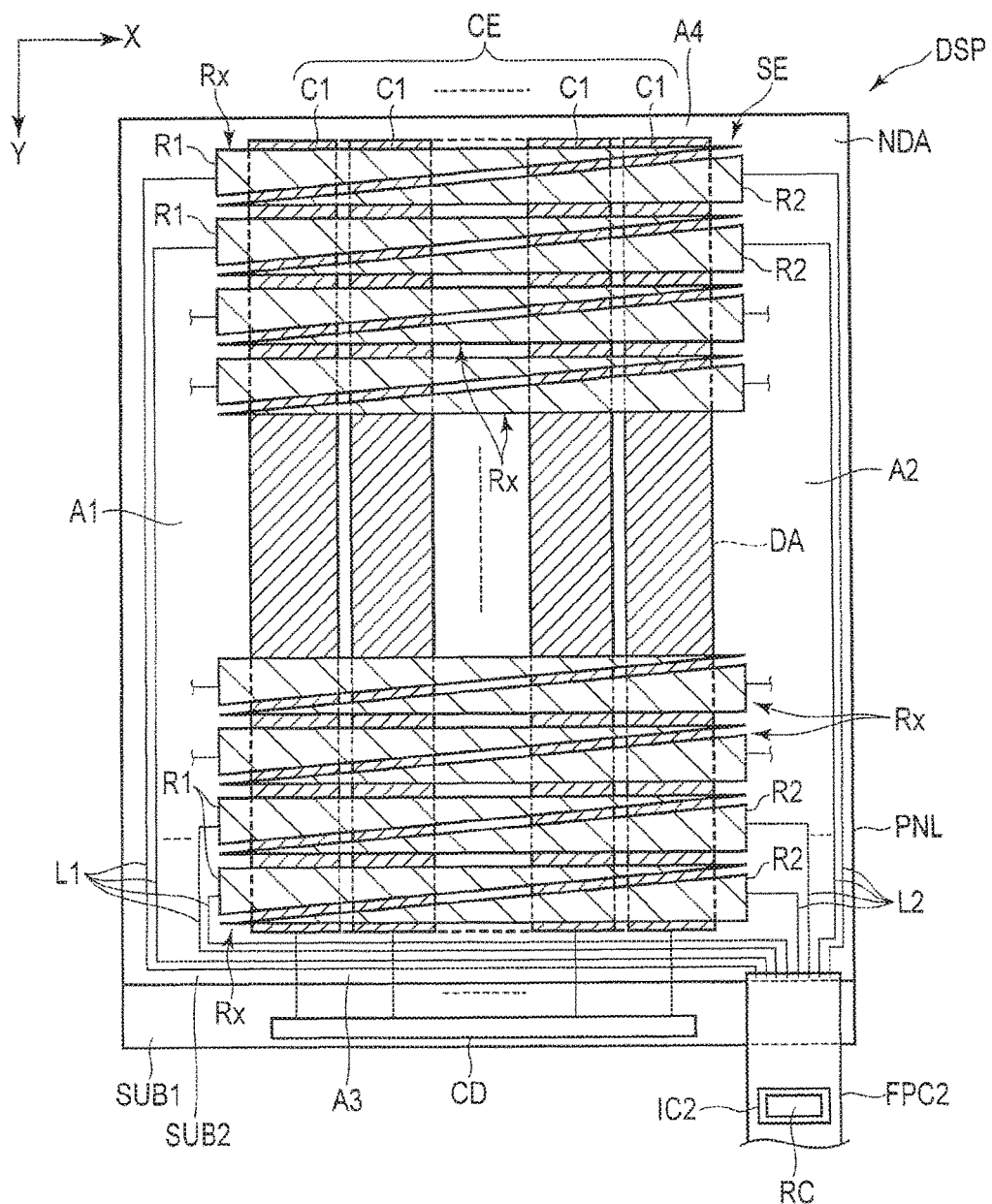
F I G. 5

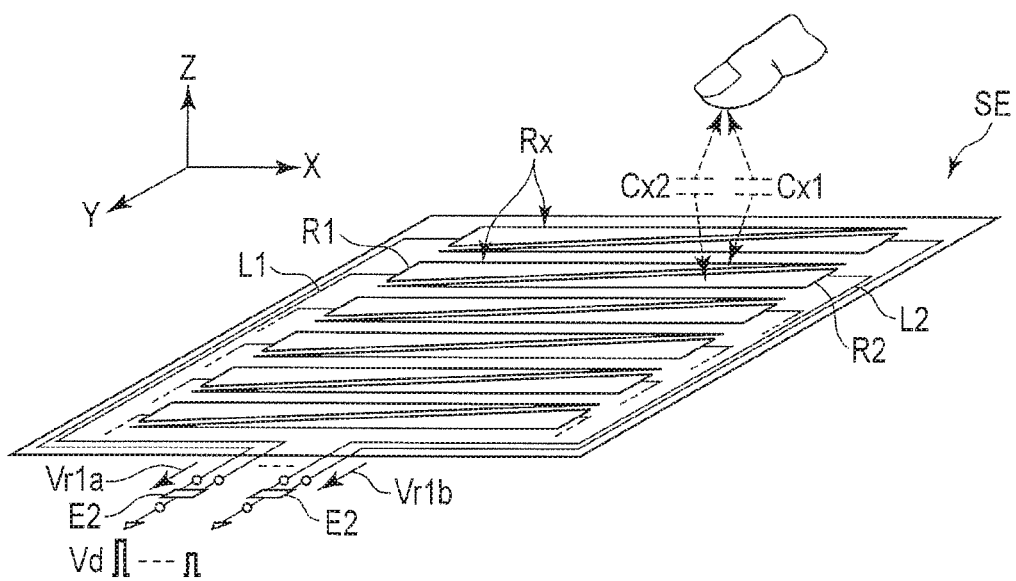
F I G. 12

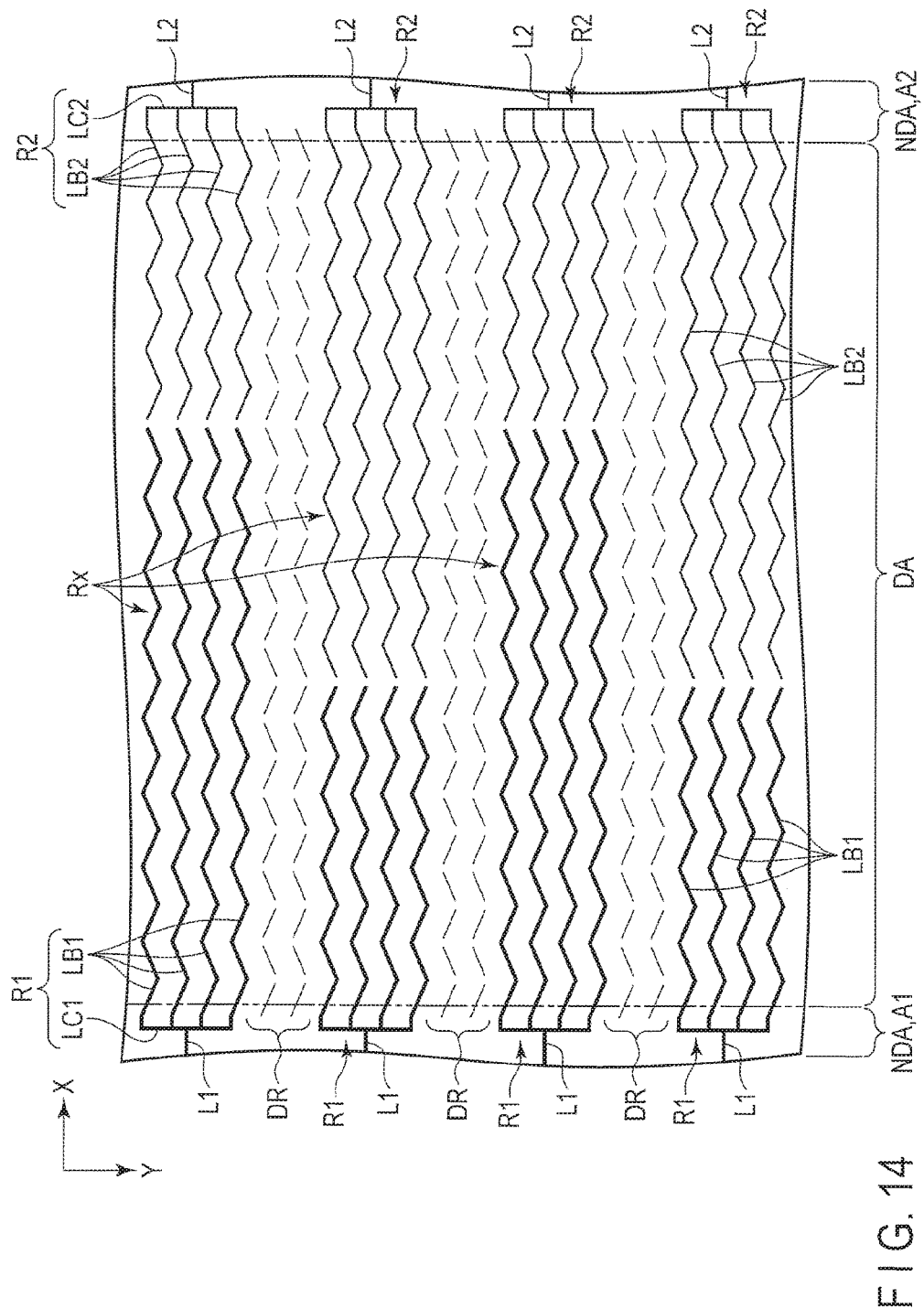
F I G. 14

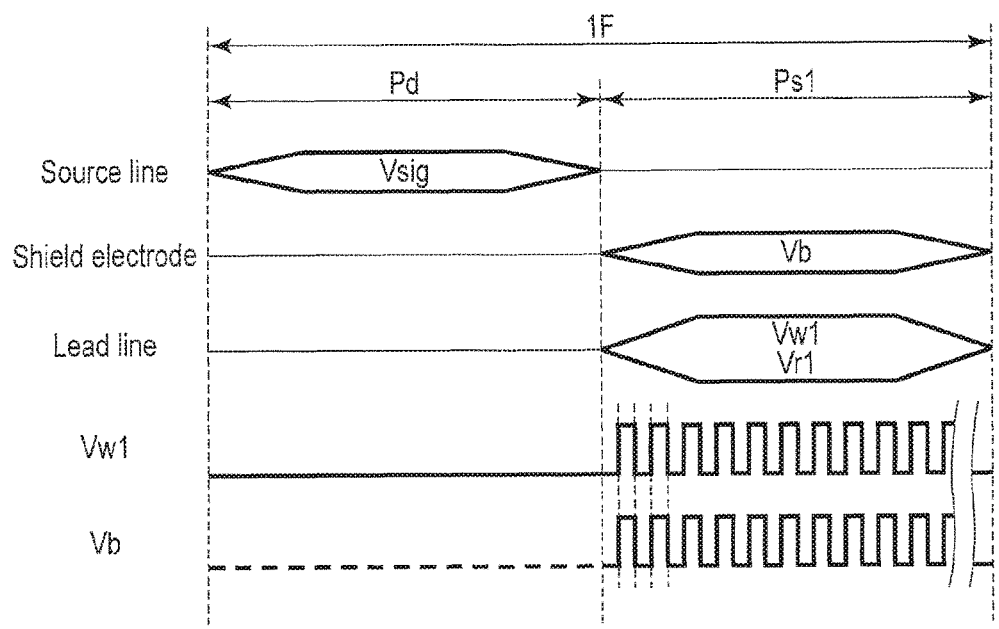
F I G. 19

SENSOR-EQUIPPED DISPLAY DEVICE

CROSS-REFERENCE TO RELATED APPLICATIONS

The present application is a continuation of U.S. application Ser. No. 14/802,102, filed Jul. 17, 2015, which claims priority to Japanese Application No. 2014-147440, filed Jul. 18, 2014, the disclosures of which are hereby incorporated by reference.

FIELD

Embodiments described herein relate generally to a sensor-equipped display device.

BACKGROUND

In recent years, a sensor-equipped display device including a sensor (also called "touch panel" in some cases), which detects a contact or an approach of an object, has been put to practical use. As an example of the sensor, there is known an electrostatic capacitance-type sensor which detects a contact or an approach of a conductor, such as a finger, based on a variation in electrostatic capacitance. Such a sensor is composed of a detection electrode. Alternatively, the sensor is composed of a detection electrode and a sensor driving electrode, which are opposed via a dielectric.

SUMMARY

This application relates generally to a sensor-equipped display device.

In an embodiment, a sensor-equipped display device is provided, comprising a display panel comprising a common electrode; a sensor comprising a plurality of detection electrodes extending in a first direction and arranged in a second direction crossing the first direction, each of the detection electrodes including a first electrode and a second electrode which are opposed to the common electrode, are divided and extend in the first direction, the first electrode including a greater area in a rear part than in a front part in the first direction in the detection electrode, and the second electrode including a greater area in the front part than in the rear part in the first direction in the detection electrode; and a controller configured to effect switching to either a first mode or a second mode, and to control driving of the common electrode and the detection electrodes, wherein the controller is configured to write, in the first mode, a first write signal to the first electrode and the second electrode of each of the detection electrodes, to read from the first electrode a first read signal indicative of a variation of the first write signal, and to read from the second electrode a second read signal indicative of a variation of the first write signal, and the controller is configured to write, in the second mode, a second write signal to the common electrode, to cause a sensor signal to occur between the common electrode and the first electrode of each detection electrode and between the common electrode and the second electrode of each detection electrode, to read a third read signal indicative of a variation of the sensor signal from the first electrode of at least one detection electrode of the detection electrodes, to read a fourth read signal indicative of a variation of the sensor signal from the second electrode of the at least one detection electrode, and to bundle the third read signal and the fourth read signal, which were read from the detection electrode that is identical, into one signal.

In a further embodiment a sensor-equipped display device is provided comprising a display panel comprising a common electrode; a sensor comprising a plurality of detection electrodes extending in a first direction and arranged in a second direction crossing the first direction, each of the detection electrodes including a first electrode and a second electrode which are opposed to the common electrode, are divided and extend in the first direction, each of the first electrode and the second electrode including a gradient in width in the first direction in the detection electrode, the gradient in width of the first electrode and the gradient in width of the second electrode being inclined in opposite directions; and a controller configured to effect switching to either a first mode or a second mode, and to control driving of the common electrode and the detection electrodes, wherein the controller is configured to write, in the first mode, a first write signal to the first electrode and the second electrode of each of the detection electrodes, to read from the first electrode a first read signal indicative of a variation of the first write signal, and to read from the second electrode a second read signal indicative of a variation of the first write signal, and the controller is configured to write, in the second mode, a second write signal to the common electrode, to cause a sensor signal to occur between the common electrode and the first electrode of each detection electrode and between the common electrode and the second electrode of each detection electrode, to read a third read signal indicative of a variation of the sensor signal from the first electrode of at least one detection electrode of the detection electrodes, to read a fourth read signal indicative of a variation of the sensor signal from the second electrode of the at least one detection electrode, and to bundle the third read signal and the fourth read signal, which were read from the detection electrode that is identical, into one signal.

In a further embodiment a sensor-equipped display device is provided comprising a display panel comprising a common electrode; and a sensor comprising a plurality of detection electrodes extending in a first direction and arranged in a second direction crossing the first direction, and a plurality of lead lines, each of the detection electrodes including a first electrode and a second electrode which are opposed to the common electrode, are divided and extend in the first direction, the first electrode including a greater area in a rear part than in a front part in the first direction in the detection electrode, the second electrode including a greater area in the front part than in the rear part in the first direction in the detection electrode, and the lead lines being connected to the first electrode and the second electrode in a one-to-one correspondence.

Additional features and advantages are described herein, and will be apparent from the following Detailed Description and the figures.

BRIEF DESCRIPTION OF THE FIGURES

FIG. 1 is a perspective view which schematically illustrates the structure of a sensor-equipped liquid crystal display device according to a first embodiment.

FIG. 4 is a cross-sectional view which schematically illustrates the structure of a part of the liquid crystal display device.

FIG. 5 is a plan view which schematically illustrates the structure of a sensor in the first embodiment.

FIG. 12 is a view for explaining the principle of an example of the sensing method by the first mode, this example being different from the example of FIG. 9.

FIG. 14 is a plan view which schematically illustrates a part of the sensor in enlarged scale, this part of the sensor being different from the parts of the sensor shown in FIG. 6 and FIG. 13.

FIG. 19 is a timing chart for explaining a method of driving the sensor-equipped liquid crystal display device according to the third embodiment, FIG. 19 being a view illustrating a video signal, a potential adjustment signal, a first write signal, a first read signal and a second read signal.

DETAILED DESCRIPTION

Figure 2:
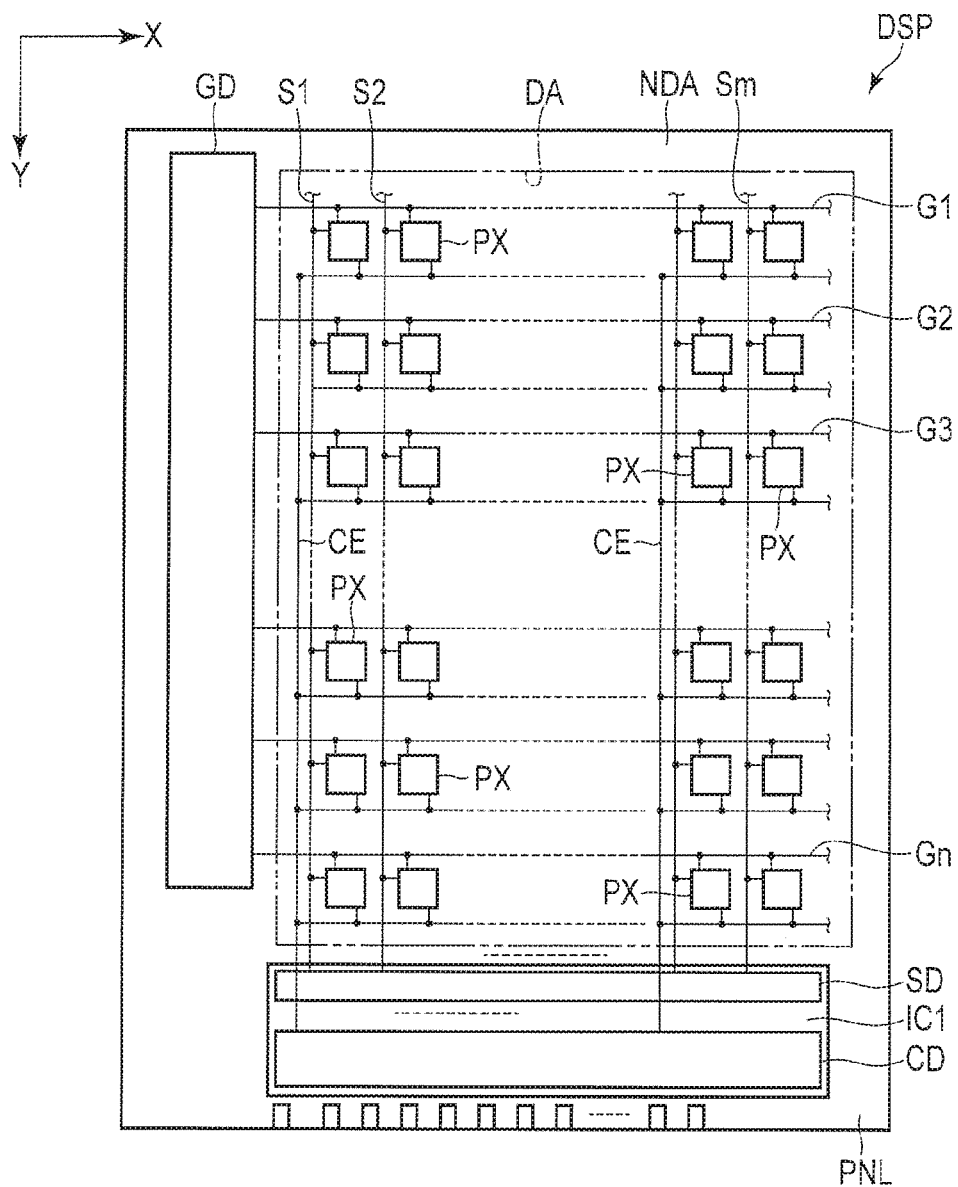
FIG. 2 is a view which schematically illustrates a basic structure and an equivalent circuit of a liquid crystal display device shown in FIG. 1.

In general, according to one embodiment, there is provided a sensor-equipped display device comprising:

a display panel comprising a common electrode;

a sensor comprising a plurality of detection electrodes extending in a first direction and arranged in a second direction crossing the first direction, each of the detection electrodes including a first electrode and a second electrode which are opposed to the common electrode, are divided and extend in the first direction, each of the first electrode and the second electrode including a gradient in width in the first direction in the detection electrode, the gradient in width of the first electrode and the gradient in width of the second electrode being inclined in opposite directions; and a controller configured to effect switching to either a first mode or a second mode, and to control driving of the common electrode and the detection electrodes.

The controller is configured to write, in the first mode, a first write signal to the first electrode and the second electrode of each of the detection electrodes, to read from the first electrode a first read signal indicative of a variation of the first write signal, and to read from the second electrode a second read signal indicative of a variation of the first write signal.

The controller is configured to write, in the second mode, a second write signal to the common electrode, to cause a sensor signal to occur between the common electrode and the first electrode of each detection electrode and between the common electrode and the second electrode of each detection electrode, to read a third read signal indicative of a variation of the sensor signal from the first electrode of at least one detection electrode of the detection electrodes, to read a fourth read signal indicative of a variation of the sensor signal from the second electrode of the at least one detection electrode, and to bundle the third read signal and the fourth read signal, which were read from the detection electrode that is identical, into one signal.

According to another embodiment, there is provided a sensor-equipped display device comprising:

a display panel comprising a common electrode; and a sensor comprising a plurality of detection electrodes extending in a first direction and arranged in a second direction crossing the first direction, and a plurality of lead lines, each of the detection electrodes including a first electrode and a second electrode which are opposed to the common electrode, are divided and extend in the first direction, the first electrode including a greater area in a rear part than in a front part in the first direction in the detection electrode, the second electrode including a greater area in the front part than in the rear part in the first direction in the detection electrode, and the lead lines being connected to the first electrode and the second electrode in a one-to-one correspondence.

Embodiments of the present invention will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference signs, and a detailed description thereof is omitted unless otherwise necessary.

To begin with, the basic concept of embodiments of the invention is described.

A sensor-equipped display device includes a display panel and a sensor, and is configured to detect data which is input from a display surface side with use of input means. The sensor is an electrostatic capacitance-type sensor. As the input means, a conductor such as a pointing device (e.g. a pen-type device, or a stylus), or a human body (e.g. a finger) can be used. Thereby, the display device can detect position information of a location where a finger or the like has come in contact with, or has approached, an input surface of the display device.

For example, the sensor is composed of a detection electrode, and first input position information can be detected by the detection electrode. For example, patent document 1 (Jpn. Pat. Appln. KOKAI Publication No. 2007-299409) discloses a technique in which first input position information can be detected by a detection electrode. The detection electrode of patent document 1 includes three kinds of electrodes, namely a plurality of electrodes (102), a plurality of electrodes (103) and a plurality of electrodes (104). A Y coordinate of the first input position information can generally be detected by the electrodes (102). An X coordinate of the first input position information can generally be detected by the electrodes (103) and electrodes (104).

However, as described above, the electrodes for detecting the Y coordinate and the electrodes for detecting the X coordinate are different, and these electrodes are arranged in the Y axis. It is thus difficult to finely or exactly detect the Y coordinate.

In addition, since the X coordinate is determined by an electric field gradient which is generated by triangular shapes of the electrodes (103) and electrodes (104), it is also difficult to finely (exactly) detect the X coordinate.

Besides, the electrodes (103) are electrically connected, and the electrodes (104) are also electrically connected. Thus, multi-touch detection is difficult. Here, the multi-touch detection means, for example, detection of position information of locations where a plurality of fingers have come in contact with, or have approached, the input surface of the display device.

This being the case, there is a demand for a technique with which the X coordinate and Y coordinate can exactly be detected and the multi-touch detection can exactly be performed.

On the other hand, the sensor functions by a combination of a detection electrode and a common electrode, and can detect second input position information by the combination of the detection electrode and common electrode. For example, patent document 2 (Jpn. Pat. Appln. KOKAI Publication No. 2009-244958) discloses a technique which enables detection of the second input position information by the combination of a detection electrode (44) and a common electrode (43).

In the sensor with the above-described structure, the X coordinate and Y coordinate of the second input position information can finely or exactly be detected by the detection electrode (44) and common electrode (43). In addition, in this sensor, multi-touch detection can also be exactly detected.

In the meantime, if the detection of the first input position information by the detection electrode and the detection of the second input position information by the combination of the detection electrode and common electrode are compared, the following is understood. Specifically, the detection of the second input position information needs to be performed more finely than the detection of the first input position information, and takes a longer time than the detection of the first input position information.

Taking the above into account, in the embodiments of the present invention, there is provided a sensor-equipped display device which can detect the first input position information by detection electrodes, and can detect the second input position information by the combination of the detection electrodes and common electrode.

For example, by detecting the first input position information by the detection electrodes, with the entirety of the input area being set to be the target of detection, the X coordinate and Y coordinate of the input position can generally be detected in a short time. Thereby, the area of the target of detection can be specified from the input area, based on the first input position information. Thereafter, by detecting the second input position information by the combination of the detection electrodes and common electrode, with only the specified area of the input area being set to be the target of detection, the X coordinate and Y coordinate of the input position in the specified area can finely or exactly be detected.

Next, the means and methods for solving the above problem will be described.

First Embodiment

Referring to the accompanying drawings, a detailed description is given of a sensor-equipped display device according to a first embodiment. Incidentally, in the present embodiment, the case in which the display device is a liquid crystal display device is described. FIG. 1 is a perspective view which schematically illustrates the structure of the sensor-equipped liquid crystal display device according to this embodiment.

As illustrated in FIG. 1, a liquid crystal display device DSP includes an active-matrix-type liquid crystal display panel PNL, a driver IC chip IC1 which drives the liquid crystal display panel PNL, a sensor SE of an electrostatic capacitance type, a driver IC chip IC2 which drives the sensor SE, a backlight unit BL which illuminates the liquid crystal display panel PNL, a control module CM, flexible wiring boards FPC1, FPC2, FPC3, etc.

The liquid crystal display panel PNL includes a first substrate SUB1 having a flat plate shape, a second substrate SUB2 having a flat plate shape, which is disposed opposite to the first substrate SUB1, and a liquid crystal layer (a liquid crystal layer LQ to be described later) which is held between the first substrate SUB1 and second substrate SUB2. Incidentally, in this embodiment, the first substrate SUB1 can be restated as an array substrate, and the second substrate SUB2 can be restated as a counter-substrate. The liquid crystal display panel PNL includes a display area (active area) DA which displays an image. This liquid crystal display panel PNL is a transmissive liquid crystal display panel with a transmissive display function of displaying an image by selectively transmitting light from the backlight unit BL. Incidentally, the liquid crystal display panel PNL may be a transflective liquid crystal display having, in addition to the transmissive display function, a reflective display function of displaying an image by selectively reflecting ambient light.

The backlight unit BL is located at a back surface side of the first substrate SUB1. As this backlight unit BL, various modes are applicable. In addition, a backlight unit utilizing a light-emitting diode (LED) as the light source, for instance, is applicable. A description of the detailed structure of the backlight unit BL is omitted. Incidentally, in the case where the liquid crystal display panel PNL is a reflective type having only the reflective display function, the backlight unit BL is omitted.

The sensor SE includes a plurality of detection electrodes Rx. These detection electrodes Rx are provided, for example, above an external surface ES on that screen side of the liquid crystal display panel PNL, which displays an image. Thus, the detection electrodes Rx may be in contact with the external surface ES, or may be positioned apart from the external surface ES. In the latter case, a member, such as an insulation film, is interposed between the external surface ES and the detection electrodes Rx. In the present embodiment, the detection electrodes Rx are in contact with the external surface ES. Here, the external surface ES is that surface of the second substrate SUB2, which is opposite to the surface facing the first substrate SUB1, and the external surface ES includes a display surface which displays an image.

In addition, in the example illustrated, the respective detection electrodes Rx extend substantially in a row direction X, and are arranged in a column direction Y crossing the row direction X. In this example, the row direction X and column direction Y are perpendicular to each other. In the present embodiment, the row direction X is a first direction, and the column direction Y is a second direction. A thickness direction Z of the liquid crystal display panel PNL is a third direction, and is perpendicular to each of the row direction X and column direction Y.

The respective detection electrodes Rx may extend in the column direction Y and may be arranged in the row direction X, as will be described later. In this case, the column direction Y becomes the first direction, and the row direction X becomes the second direction.

The driver IC chip IC1 functioning as a first driver is mounted on the first substrate SUB1 of the liquid crystal display panel PNL. The flexible wiring board FPC1 connects the liquid crystal display panel PNL with the control module CM. The flexible wiring board FPC2 connects the detection electrodes Rx of the sensor SE with the control module CM. The driver IC chip IC2 functioning as a second driver is mounted on the flexible wiring board FPC2. The flexible wiring board FPC3 connects the backlight unit BL with the control module CM. Here, the control module CM can be restated as an application processor.

The driver IC chip IC1 and driver IC chip IC2 are connected via the flexible wiring board FPC2, etc. For example, in the case where the flexible wiring board FPC2 includes a branch portion FPCB which is connected onto the first substrate SUB1, the driver IC chip IC1 and driver IC chip IC2 may be connected via wiring lines on the branch portion FPCB and first substrate SUB1. In addition, the driver IC chip IC1 and driver IC chip IC2 may be connected via the flexible wiring boards FPC1 and FPC2.

The driver IC chip IC2 can deliver a timing signal, which indicates the timing of driving of the sensor SE, to the driver IC chip IC1. Alternatively, the driver IC chip IC1 can deliver a timing signal, which indicates the timing of driving of a common electrode CE (to be described later), to the driver IC chip IC2. Alternatively, the control module CM can deliver timing signals to the driver IC chips IC1 and IC2. By the timing signals, the driving of the driver IC chip IC1 and the driving of the driver IC chip IC2 can be synchronized.

FIG. 2 is a view which schematically illustrates a basic structure and an equivalent circuit of the liquid crystal display device DSP shown in FIG. 1.

As illustrated in FIG. 2, the liquid crystal display device DSP includes, in addition to the liquid crystal display panel PNL, etc., the driver IC chip IC1, a gate line driving circuit GD, etc., which are located in a non-display area NDA on the outside of the display area DA. In the embodiment, the driver IC chip IC1 includes a source line driving circuit SD and a common electrode driving circuit CD. Incidentally, the driver IC chip IC1 may include at least parts of the source line driving circuit SD and common electrode driving circuit CD. The shape of the non-display area NDA is a picture frame shape (rectangular frame shape) surrounding the display area DA.

The liquid crystal display panel PNL includes a plurality of pixels PX in the display area DA. The pixels PX are disposed in a matrix in the row direction X and column direction Y, and the number of pixels PX is m×n (m and n are positive integer numbers). In addition, the liquid crystal display panel PNL includes, in the display area DA, an n-number of gate lines G (G1 to Gn), an m-number of source lines S (S1 to Sm) and a common electrode CE.

The gate lines G extend substantially linearly in the row direction X, are led out to the outside of the display area DA, and are connected to the gate line driving circuit GD. In addition, the gate lines G are arranged at intervals in the column direction Y. The source lines S extend substantially linearly in the column direction Y, are led out to the outside of the display area DA, and are connected to the source line driving circuit SD. In addition, the source lines S are arranged at intervals in the row direction X, and cross the gate lines G. In the meantime, the gate lines G and source lines S may not necessarily extend linearly, and portions thereof may be bent. The common electrode CE is provided in the display area DA, and is electrically connected to the common electrode driving circuit CD. The details of the common electrode CE will be described later.

Figure 3:
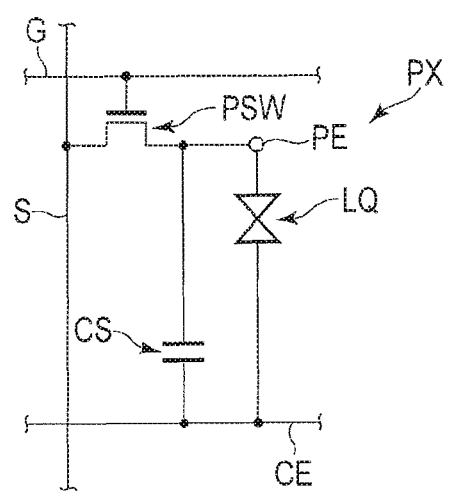
FIG. 3 is an equivalent circuit diagram illustrating a pixel shown in FIG. 2.

FIG. 3 is an equivalent circuit diagram illustrating the pixel PX shown in FIG. 2.

As illustrated in FIG. 3, each pixel PX includes a pixel switching element PSW, a pixel electrode PE, a common electrode CE, and a liquid crystal layer LQ. The pixel switching element PSW is formed of, for example, a thin-film transistor. The pixel switching element PSW is electrically connected to the gate line G and source line S. The pixel switching element PSW may be either a top-gate type or a bottom-gate type. In addition, although a semiconductor layer of the pixel switching element PSW is formed of, for example, polysilicon, the semiconductor layer may be formed of amorphous silicon or an oxide semiconductor. The pixel electrode PE is electrically connected to the pixel switching element PSW. The pixel electrode PE is opposed to the common electrode CE. The common electrode CE, an insulation film and pixel electrode PE form a storage capacitance CS.

FIG. 4 is a cross-sectional view which schematically illustrates the structure of a part of the liquid crystal display device DSP.

Specifically, the liquid crystal display device DSP includes a first optical element OD1, a second optical element OD2, etc., in addition to the above-described liquid crystal display panel PNL and backlight unit BL. Although the illustrated liquid crystal display panel PNL has a structure that is adaptive to an FFS (Fringe Field Switching) mode as a display mode, it may have a structure adaptive to some other display mode. For example, the liquid crystal display panel PNL may have a structure that is adaptive to an IPS (In-Plane Switching) mode which mainly utilizes a lateral electric field that is substantially parallel to the substrate major surface, such as an FFS mode. In the display mode utilizing the lateral electric field, for example, a structure, in which both the pixel electrode PE and common electrode CE are provided on the first substrate SUB1, is applicable. Alternatively, the liquid crystal display panel PNL may have a structure that is adaptive to a display mode which mainly utilizes a vertical electric field that is substantially perpendicular to the substrate major surface, such as a TN (Twisted Nematic) mode, an OCB (Optically Compensated Bend) mode or a VA (Vertical Aligned) mode. In the display mode utilizing the vertical electric field, for example, a structure, in which the pixel electrode PE is provided on the first substrate SUB1 and the common electrode CE is provided on the second substrate SUB2, is applicable. Incidentally, the substrate major surface, in this context, refers to a surface which is parallel to an X-Y plane defined by the row direction X and column direction Y which are perpendicular to each other.

The liquid crystal display panel PNL includes the first substrate SUB1, second substrate SUB2 and liquid crystal layer LQ. The first substrate SUB1 and second substrate SUB2 are bonded in a state in which a predetermined gap is created therebetween. The liquid crystal layer LQ is sealed in a space between the first substrate SUB1 and second substrate SUB2.

The first substrate SUB1 is formed by using a first insulative substrate 10 with light transmissivity, such as a glass substrate or a resin substrate. The first substrate SUB1 includes source lines S, a common electrode CE, pixel electrodes PE, a first insulation film 11, a second insulation film 12, a third insulation film 13, a first alignment film AL1, etc., on that side of the first insulative substrate 10, which is opposed to the second substrate SUB2.

The first insulation film 11 is disposed on the first insulative substrate 10. Although not described in detail, in the present embodiment, pixel switching elements of, for example, a top gate structure are applied. In this embodiment, the first insulation film 11 includes a plurality of insulation layers which are stacked in the thickness direction Z. For example, the first insulation film 11 includes various insulation layers, such as an undercoat layer lying between the first insulative substrate 10 and the semiconductor layer of the pixel switching element; a gate insulation layer lying between the semiconductor layer and the gate electrode; and an interlayer insulation layer lying between the gate electrode and electrodes including a source electrode and a drain electrode. Like the gate electrode, the gate line is disposed between the gate insulation layer and the interlayer insulation layer. The source lines S are formed on the first insulation film 11. In addition, the source electrode and drain electrode of each pixel switching element are formed on the first insulation film 11. In the example illustrated, the source lines S extend in the column direction Y.

The second insulation film 12 is disposed on the source lines S and first insulation film 11. The common electrode CE is formed on the second insulation film 12. The common electrode CE is formed of a transparent, electrically conductive material such as indium tin oxide (ITO), indium zinc oxide (IZO) or zinc oxide (ZnO). Incidentally, in the example illustrated, metal layers ML are formed on the common electrode CE, and the resistance of the common electrode CE is decreased. However, the metal layers ML may be omitted.

The third insulation film 13 is disposed on the common electrode CE and second insulation film 12. The pixel electrodes PE are formed on the third insulation film 13. Each pixel electrode PE is located between the neighboring source lines S and is opposed to the common electrode CE. In addition, each pixel electrode PE includes a slit SL at a position opposed to the common electrode CE. Such pixel electrodes PE are formed of, for example, a transparent, electrically conductive material such as ITO or IZO. The first alignment film AL1 covers the pixel electrodes PE and third insulation film 13.

On the other hand, the second substrate SUB2 is formed by using a second insulative substrate 20 with light transmissivity, such as a glass substrate or a resin substrate. The second substrate SUB2 includes a black matrix BM, color filters CFR, CFG, CFB, an overcoat layer OC, and a second alignment film AL2, on that side of the second insulative substrate 20, which is opposed to the first substrate SUB1.

The black matrix BM is formed on an inner surface of the second insulative substrate 20 and light-shields the gate lines G, source lines S and pixel switching elements PSW. The color filters CFR, CFG, CFB are formed on the inner surface of the second insulative substrate 20, and parts thereof overlap the black matrix BM. The color filter CFR is a red color filter which is disposed in a red pixel and is formed of a red resin material. The color filter CFG is a green color filter which is disposed in a green pixel and is formed of a green resin material. The color filter CFB is a blue color filter which is disposed in a blue pixel and is formed of a blue resin material.

The example illustrated corresponds to the case in which a unit pixel, which is a minimum unit constituting a color image, is composed of three color pixels, namely a red pixel, a green pixel and a blue pixel. However, the unit pixel is not limited to the combination of the three color pixels. For example, the unit pixel may be composed of four color pixels, with a white pixel being added to the red pixel, green pixel and blue pixel. In this case, a white color filter or transparent filter may be disposed in the white pixel, or the filter itself of the white pixel may be omitted. The overcoat layer OC covers the color filters CFR, CFG, CFB. The overcoat layer OC is formed of a transparent resin material. The second alignment film AL2 covers the overcoat layer OC.

Detection electrodes Rx are located between the second insulative substrate 20 and the second optical element OD2. The detection electrodes Rx are formed above a front surface (external surface ES) of the second insulative substrate 20. The detailed structure of the detection electrode Rx will be described later. Here, the detection electrode Rx is illustrated in a simplified fashion, and the depiction of lead lines (L1, L2), which will be described later, is omitted. The detection electrodes Rx are opposed to the common electrode CE through dielectrics such as the third insulation film 13, first alignment film AL1, liquid crystal layer LQ, second alignment film AL2, overcoat layer OC, color filters CFR, CFG and CFB, and second insulative substrate 20.

The first optical element OD1 is disposed between the first insulative substrate 10 and backlight unit BL. The second optical element OD2 is disposed above the detection electrodes Rx. Each of the first optical element OD1 and second optical element OD2 includes at least a polarizer, and may also include a retardation plate, where necessary. The absorption axis of the polarizer included in the first optical element OD1 and the absorption axis of the polarizer included in the second optical element OD2 are perpendicular to each other. In addition, the liquid crystal display device DSP can detect position information of a location where a finger or the like has come in contact with, or has approached, an input surface IS of the liquid crystal display device DSP. In this embodiment, the input surface IS of the liquid crystal display device DSP is the surface of the second optical element OD2.

The input surface IS, however, is not limited to the surface of the second optical element OD2, and can be variously modified. For example, in a case where a third insulative substrate, which is different from the first insulative substrate 10 and second insulative substrate 20, is located on the surface of the liquid crystal display device DSP, the input surface IS is the surface of the third insulative substrate. The third insulative substrate is a substrate with light transmissivity, such as a glass substrate or a resin substrate. When the third insulative substrate is a glass substrate, the third insulative substrate functions as a cover glass.

Next, the sensor SE of the electrostatic capacitance type, which is included in the liquid crystal display device DSP of this embodiment, is described. FIG. 5 is a plan view which schematically illustrates the structure of the sensor SE in the embodiment. In FIG. 5, although depiction of the above-described driver IC chip IC1 is omitted, the common electrode driving circuit CD is provided in the driver IC chip IC1, as described above.

As illustrated in FIG. 5, the sensor SE of the embodiment includes the detection electrodes Rx and lead lines L1 and L2 on the second substrate SUB2 side, and utilizes the common electrode CE on the first substrate SUB1 side. Specifically, the common electrode CE functions as an electrode for display, and also functions as a sensor driving electrode.

The common electrode CE and detection electrodes Rx are disposed in the display area DA. In the example illustrated, the common electrode CE includes, in the display area DA, a plurality of divisional electrodes C1 which are arranged at intervals in the row direction X, extend substantially linearly in the column direction Y, and are formed in stripe shapes. Each divisional electrode C1 is formed in band shape.

The non-display area NDA includes a first area A1 (a band-shaped area extending in the column direction Y) on a left side of the second substrate SUB2, a second area A2 (a band-shaped area extending in the column direction Y) on a right side of the second substrate SUB2, a third area A3 (a band-shaped area extending in the row direction X) on a lower side of the second substrate SUB2, and a fourth area A4 (a band-shaped area extending in the row direction X) on an upper side of the second substrate SUB2. In the present embodiment, the display area DA has a rectangular shape, and the lead lines L1, L2 are located in the first area A1, second area A2 and third area A3 of the second substrate SUB2.

The detection electrodes Rx are arranged at intervals in the column direction Y in the display area DA, and substantially linearly extend in the row direction X. Specifically, in this example, the detection electrodes Rx extend in a direction crossing the divisional electrodes C1. The common electrode CE (divisional electrodes C1 extending in the column direction Y) and the detection electrodes Rx extending in the row direction X are opposed to each other with various dielectrics interposed, as described above.

The detection electrode Rx includes a first electrode R1 and a second electrode R2, which are divided and extend in the row direction X. The first electrode R1 has a greater area in a rear part than in a front part in the row direction X in the detection electrode Rx. The first electrode R1 includes an end portion projecting forward in the row direction X, and is formed in a triangular shape. The second electrode R2 has a greater area in the front part than in the rear part in the row direction X in the detection electrode Rx. The second electrode R2 includes an end portion projecting rearward in the row direction X, and is formed in a triangular shape. In the column direction Y, the first electrodes R1 and second electrodes R2 of the detection electrodes Rx are alternately arranged. It is desirable that the area of the first electrode R1 and the area of the second electrode R2 be equal (e.g. identical).

Incidentally, in FIG. 5, an upper left in plan view of the liquid crystal display device DSP is set to be a reference point in the row direction X and column direction Y, but the reference point is not limited to this and may be arbitrarily set. In FIG. 5, a direction toward the right from the left in plan view is set to be a positive direction of the row direction X, and a direction toward the left from the right in plan view is set to be a negative direction of the row direction X. In addition, in FIG. 5, a downward direction from above in plan view is set to be a positive direction of the column direction Y, and an upward direction from below in plan view is set to be a negative direction of the column direction Y.

In the meantime, if the above description is restated, each of the first electrode R1 and second electrode R2 has a gradient in width in the row direction X, and the gradient in width of the first electrode R1 and the gradient in width of the second electrode R2 are inclined in opposite directions. To be more specific, the first electrode R1 has a width increasing in the negative direction of the row direction X, and the second electrode R2 has a width increasing in the positive direction of the row direction X. Incidentally, it is preferable that the sum of the widths of the first electrode R1 and second electrode R2 is equal in any point in the row direction X.

Furthermore, if the above-description is restated, it can be said that the first electrode R1 and second electrode R2 are triangular electrodes and the first electrode R1 and second electrode R2 are disposed in point symmetry.

Incidentally, the number, size and shape of divisional electrodes C1 are not particularly restricted, and are variously changeable. For instance, as in an example which will be described later, the divisional electrodes C1 may extend in the row direction X, and the detection electrodes Rx may extend in the column direction Y.

The lead lines L1 and L2 are provided above the external surface ES of the liquid crystal display panel PNL in the non-display area NDA. The lead lines L1 are electrically connected to the first electrodes R1 in a one-to-one correspondence, and are disposed in the first area A1 and third area A3 of the second substrate SUB2. Each of the lead lines L1 outputs a sensor output value (read signal) from the first electrode R1. The lead lines L2 are electrically connected to the second electrodes R2 in a one-to-one correspondence, and are disposed in the second area A2 of the second substrate SUB2. Each of the lead lines L2 outputs a sensor output value (read signal) from the second electrode R2. The above-described layout of lead lines L1 and L2 is adaptive to uniformization in width in the row direction X of the first area A1 and second area A2 and to reduction in picture frame size of the liquid crystal display device DSP. The lead lines L, for example, like the detection electrodes Rx, are disposed above the external surface ES of the liquid crystal display panel PNL.

Incidentally, if the above-description is restated, it can be said that the width of the first electrode R1 varies in the direction of extension thereof in accordance with a distance from a connection portion of the first electrode R1 to the lead line L1. In FIG. 5, the width of the first electrode R1 becomes larger toward the connection portion to the lead line L1, and becomes smaller away from the connection portion. Incidentally, the variation in width may be continuous or may be stepwise. In addition, in FIG. 5, the relationship between the second electrode R2 and lead line L2 is the same as the relationship between the first electrode R1 and lead line L1. The width of the second electrode R2 varies in the direction of extension thereof in accordance with a distance from a connection portion of the second electrode R2 to the lead line L2. In FIG. 5, the width of the second electrode R2 becomes larger toward the connection portion to the lead line L2, and becomes smaller away from the connection portion.

The liquid crystal display device DSP further includes the common electrode driving circuit (first driver) CD which is disposed in the non-display area NDA. Each of the divisional electrodes C1 is electrically connected to the common electrode driving circuit CD. The common electrode driving circuit CD delivers a common driving signal to the divisional electrodes C1 at a display driving time for displaying an image. Incidentally, at a sensing driving time for executing sensing, the common electrode driving circuit CD may deliver a sensor driving signal to the divisional electrodes C1.

The flexible wiring board FPC2 is, in the non-display area NDA, connected to an OLB (Outer Lead Bonding) pad group which is disposed above the external surface ES of the liquid crystal display panel PNL. The respective pads of the OLB pad group are electrically connected to the detection electrodes Rx (first electrodes R1, second electrodes R2) via the lead lines L1, L2. In this embodiment, the lead lines L are formed of a metal as an electrically conductive material. By forming the lead line L of a metallic material having a much lower electrical resistance value than a transparent, electrically conductive material, the width of the lead line L can be decreased. Furthermore, since the OLB pad group can be densely disposed at one location of the third area A3 of the second substrate SUB2, the size and cost of the flexible wiring board FPC2 can be reduced.

A detection circuit RC is incorporated in, for example, the driver IC chip IC2. The detection circuit RC detects a contact of a conductor with the input surface IS of the liquid crystal display device DSP, or an approach of the conductor to the input surface IS, based on a sensor output value from the detection electrode Rx. Furthermore, the detection circuit RC can detect position information of a location where the conductor has come in contact with, or has approached, the input surface IS. Incidentally, the detection circuit RC may be included in the control module CM.

Figure 6:
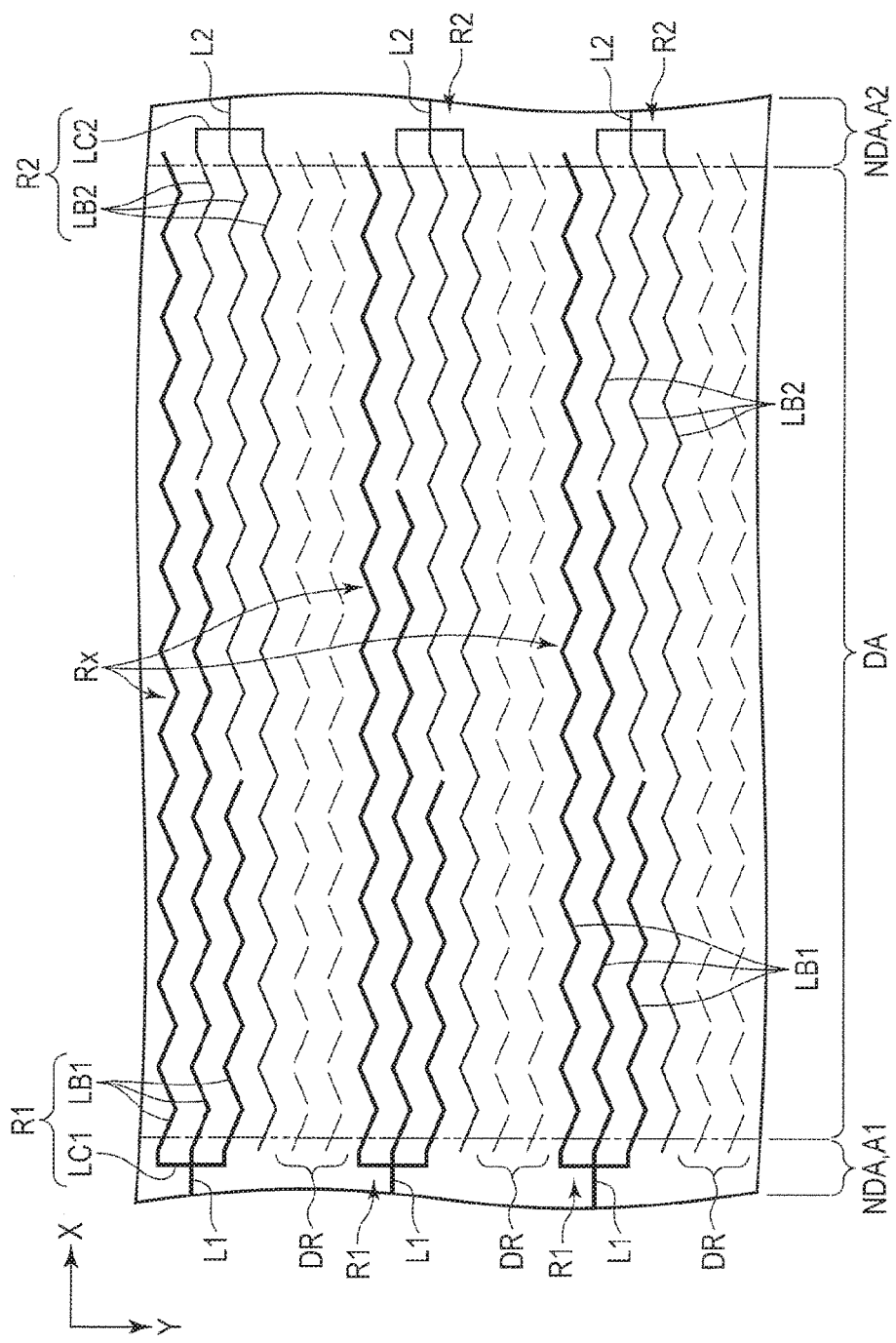
FIG. 6 is a plan view which schematically illustrates a part of the sensor in enlarged scale.

FIG. 6 is a plan view which schematically illustrates, in enlarged scale, a part of the sensor SE shown in FIG. 5.

As illustrated in FIG. 6, the first electrode R1 includes a plurality of detection lines LB1, and a connection line LC1 which is connected to the lead line L1. The detection lines LB1 extend substantially in the row direction X in the display area DA, and are connected to the connection line LC1 in the non-display area NDA. In the example illustrated, each of the detection lines LB1 is formed in a wavy shape (to be more specific, a triangular wave shape). These detection lines LB1 are arranged substantially at regular intervals in the column direction Y. Each first electrode R1 includes three detection lines LB1. Of the three detection lines LB1, the upper detection line LB1, in plan view, is located over the entirety of the display area DA (the left area, middle area and right area) in the row direction X. The middle detection line LB1 in the column direction Y is located on ⅔ of the display area DA (the left area and middle area) in the row direction X, and the lower detection line LB1, in plan view, is located on ⅓ of the display area DA (the left area) in the row direction X. The three detection lines LB1 form the first electrode R1 of the triangular shape.

The second electrode R2 includes a plurality of detection lines LB2, and a connection line LC2 which is connected to the lead line L2. The detection lines LB2 extend substantially in the row direction X in the display area DA, and are connected to the connection line LC2 in the non-display area NDA. In the example illustrated, each of the detection lines LB2 is formed in a wavy shape (to be more specific, a triangular wave shape). These detection lines LB2 are arranged substantially at regular intervals in the column direction Y. Each second electrode R2 includes three detection lines LB2. Of the three detection lines LB2, the upper detection line LB2, in plan view, is located on ⅓ of the display area DA (the right area) in the row direction X. The middle detection line LB2 in the column direction Y is located on ⅔ of the display area DA (the right area and middle area) in the row direction X, and the lower detection line LB2, in plan view, is located over the entirety of the display area DA (the right area, middle area and left area) in the row direction X. The three detection lines LB2 form the second electrode R2 of the triangular shape.

Here, the middle detection line LB1 and the upper detection line LB2 are opposed in the row direction X. In addition, the lower detection line LB1 and the middle detection line LB2 are opposed in the row direction X.

A dummy electrode DR is disposed between neighboring detection electrodes Rx. The dummy electrode DR is formed of a plurality of dummy lines which are disposed in parallel to the detection lines LB1 and LB2, and are disposed substantially at regular intervals. For example, the dummy lines are arranged in the column direction Y, extend in the row direction X, are formed in wavy shapes (to be more specific, triangular wave shapes), and are divided into a plurality of parts. The dummy lines are not connected to wiring lines such as lead lines L1 and L2, and are set in an electrically floating state. The dummy electrode DR does not contribute to detection of a contact or approach of an object. Thus, from the standpoint of detection of an object, the dummy electrode DR may not be provided. However, if the dummy electrode DR is not provided, there is a concern that the screen of the liquid crystal display panel becomes optically non-uniform. It is thus preferable to provide the dummy electrode DR.

Thereby, a variance in density of metal wires (detection lines LB1, LB2, dummy lines) in the display area DA can be further decreased, and therefore a pattern of metal wires can be made less visually recognizable. Incidentally, the dummy electrode DR (dummy lines) may be provided where necessary.

As described above, in the present embodiment, the structures of the detection electrodes Rx (first electrodes R1, second electrodes R2) and dummy electrodes DR are illustrated by way of example, and the structures of the detection electrodes Rx, etc. can be variously modified. For example, as regards the first electrode R1, the shape of the detection line LB1 can be altered, and the number of detection lines LB1 can be increased or decreased.

In this embodiment, the detection electrodes Rx (first electrodes R1, second electrodes R2) and dummy electrodes DR are formed of a metallic material as an electrically conductive material. As the metallic material, aluminum (Al), titanium (Ti), silver (Ag), molybdenum (Mo), tungsten (W), copper (Cu) and chromium (Cr) can be enumerated by way of example. Thus, like the lead lines L1 and L2, the detection lines LB1 and LB2, connection lines LC1 and LC2 and dummy lines are metal wires. By utilizing the metal as described above, the electrical resistance value of the detection electrode Rx can be decreased, and this is desirable in that the time that is needed for detection can be shortened. In addition, the use of metal wires for the detection electrodes Rx is advantageous in achieving a larger size and a higher fineness of the liquid crystal display panel PNL.

Incidentally, the material that is used for the detection electrode Rx is not limited to the metal, and is variously modifiable. For example, as in an example which will be described later, the detection electrode Rx may be formed of a transparent conductive layer which is made of a transparent, electrically conductive material such as ITO, IZO or ZnO. Alternatively, the detection electrode Rx may be formed of a combination (aggregate) of a transparent conductive layer and a metal wire.

Besides, in the present embodiment, the width of each of the detection lines LB1 and LB2 and the width of the dummy line are equal. However, in FIG. 6, in order to visually distinguish the detection line LB1, detection line LB2 and dummy line, these lines are made different in width.

Figure 7:
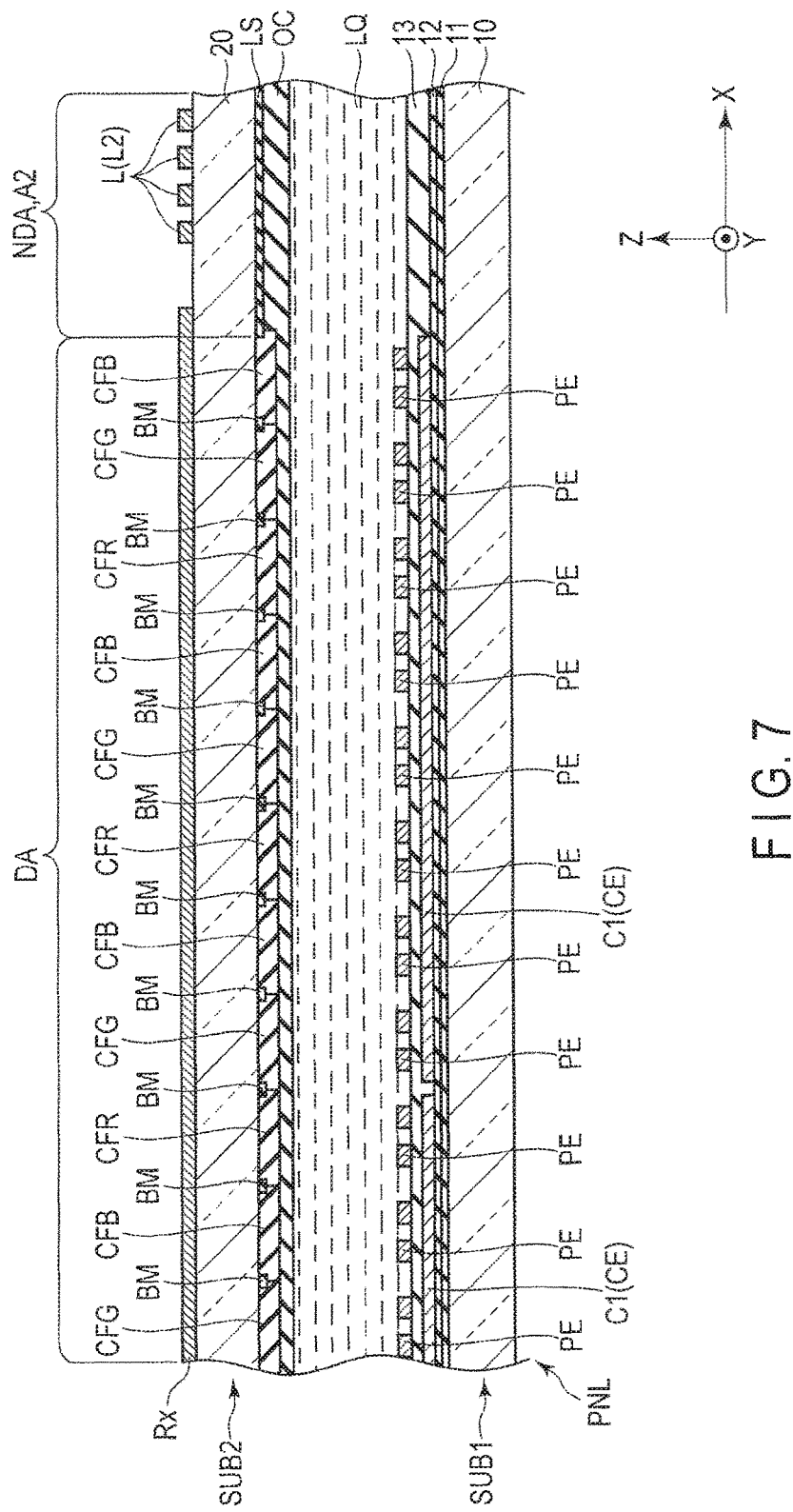
FIG. 7 is a cross-sectional view which schematically illustrates the structure of a liquid crystal display panel including a part of the sensor.

FIG. 7 is a cross-sectional view which schematically illustrates the structure of the liquid crystal display panel PNL including a part of the sensor SE. FIG. 7 shows only a main part which is necessary for the description.

As illustrated in FIG. 7, a common electrode CE and pixel electrodes PE are located on the inner surface side of the first substrate SUB1, which is opposed to the second substrate SUB2. Specifically, the common electrode CE is formed on a second insulation film 12 and is covered with a third insulation film 13. The pixel electrodes PE are formed on the third insulation film 13 and are opposed to the common electrode CE. In the example illustrated, pixel electrodes PE for eight pixels are disposed immediately above each divisional electrode C1. However, the number of pixel electrodes PE, which are located immediately above each divisional electrode C1, is not limited to this example. Incidentally, depiction of various wiring lines, such as source lines, and the first alignment film is omitted.

A black matrix BM, color filters CFR, CFG and CFB, an overcoat layer OC, and a peripheral light-shield layer LS are located on the inner surface side of the second substrate SUB2, which is opposed to the first substrate SUB1. Specifically, in the display area DA, the color filters CFR, CFG and CFB are formed at positions opposed to the respective pixel electrodes PE. The black matrix BM is located at boundaries between these color filters CFR, CFG and CFB. The peripheral light-shield layer LS is provided in the non-display area NDA, and is formed on the inner surface of the second insulative substrate 20. This peripheral light-shield layer LS is formed in a frame shape (rectangular frame shape). The peripheral light-shield layer LS is formed of the same material as the black matrix BM. The overcoat layer OC extends over the display area DA and non-display area NDA. Incidentally, depiction of the second alignment film is omitted. The lead lines L1, L2 are disposed at positions overlapping the peripheral light-shield layer LS.

Next, a description is given of an operation at a display driving time for displaying an image in the above-described FFS-mode liquid crystal display device DSP.

To begin with, an OFF state, in which no voltage is applied to the liquid crystal layer LQ, is described. The OFF state corresponds to a state in which no potential difference is produced between the pixel electrode PE and common electrode CE. In this OFF state, the liquid crystal molecules included in the liquid crystal layer LQ are initially aligned in one direction in the X-Y plane by an alignment restriction force of the first alignment film AL1 and second alignment film AL2. Part of light from the backlight unit BL passes through the polarizer of the first optical element OD1, and enters the liquid crystal display panel LPN. The light, which enters the liquid crystal display panel LPN, is linearly polarized light which is perpendicular to the absorption axis of the polarizer. The polarization state of such linearly polarized light hardly varies when the light passes through the liquid crystal display panel LPN in the OFF state. Thus, most of the linearly polarized light, which has passed through the liquid crystal display panel LPN, is absorbed by the polarizer of the second optical element OD2 (black display). A mode, in which black display is effected on the liquid crystal display panel PNL in the OFF state, is called "normally black mode".

Then, an ON state, in which a voltage is applied to the liquid crystal layer LQ, is described. The ON state corresponds to a state in which a potential difference is produced between the pixel electrode PE and common electrode CE. Specifically, a common driving signal (common voltage) is supplied to the common electrode CE from the common electrode driving circuit CD. On the other hand, such a video signal as to produce a potential difference relative to the common voltage is supplied to the pixel electrode PE. Thereby, in the ON state, a fringe electric field is produced between the pixel electrode PE and common electrode CE.

In this ON state, the liquid crystal molecules are aligned in an azimuth direction in the X-Y plane, which is different from the initial alignment direction. In the ON state, linearly polarized light, which is perpendicular to the absorption axis of the polarizer of the first optical element OD1, enters the liquid crystal display panel LPN, and the polarization state thereof varies depending on the alignment state of liquid crystal molecules when the light passes through the liquid crystal layer LQ. Thus, in the ON state, at least part of the light, which has passed through the liquid crystal layer LQ, passes through the polarizer of the second optical element OD2 (white display).

Next, a description is given of an operation at a sensing driving time for executing sensing for detecting a contact or approach of a conductor with or to the input surface IS of the above-described liquid crystal display device DSP. Specifically, a controller (control assembly), which is composed of the driver IC chips IC1 and IC2, and control module CM of the liquid crystal display device DSP, effects switching between a first mode and a second mode, controls driving of the common electrode CE and detection electrodes Rx, and executes sensing. In some cases, the first mode is called a self-capacitive sensing mode, and the second mode is called a mutual-capacitive sensing mode.

<First Mode>

To begin with, a description is given of the first mode (self-capacitive sensing mode) in which first input position information is detected by the detection electrodes Rx. The first mode has a feature that the entirety of the input area is set to be the target of detection, and the X coordinate and Y coordinate of an input position can generally be detected in a short time. As will be described later, the X coordinate can be detected from a proportional division of capacitance.

Figure 8:
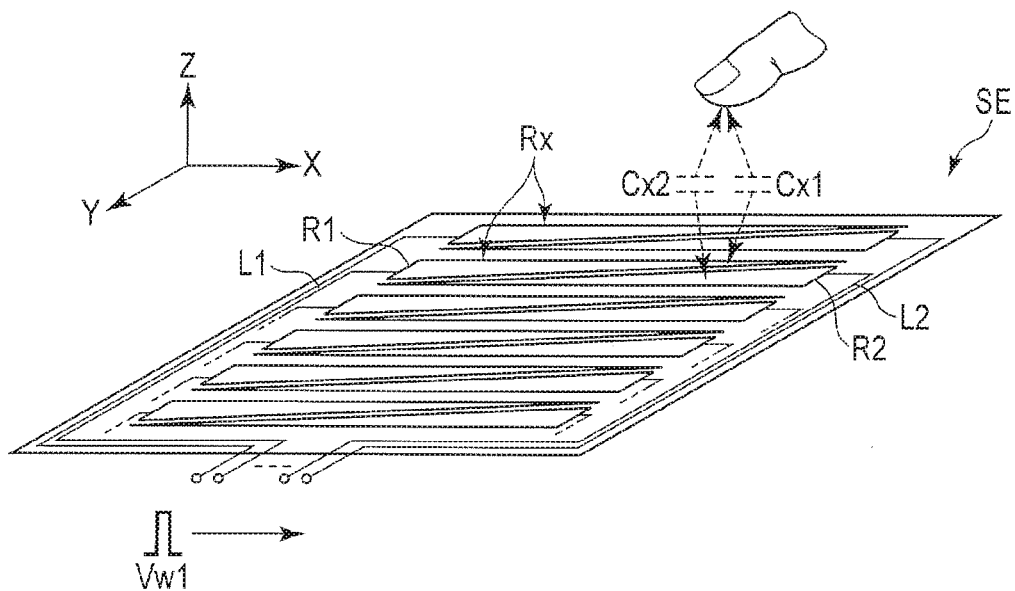
FIG. 8 is a view for explaining the principle of an example of a sensing method by a first mode.

As illustrated in FIG. 8, the controller writes a first write signal Vw1 to the first electrode R1 and second electrode R2 of each detection electrode Rx. Then, as illustrated in FIG. 9, the controller reads a first read signal Vr1$a$ indicative of a variation of the first write signal Vw1 from the first electrode R1, and reads a second read signal Vr1$b$ indicative of a variation of the first write signal Vw1 from the second electrode R2.

Figure 9:
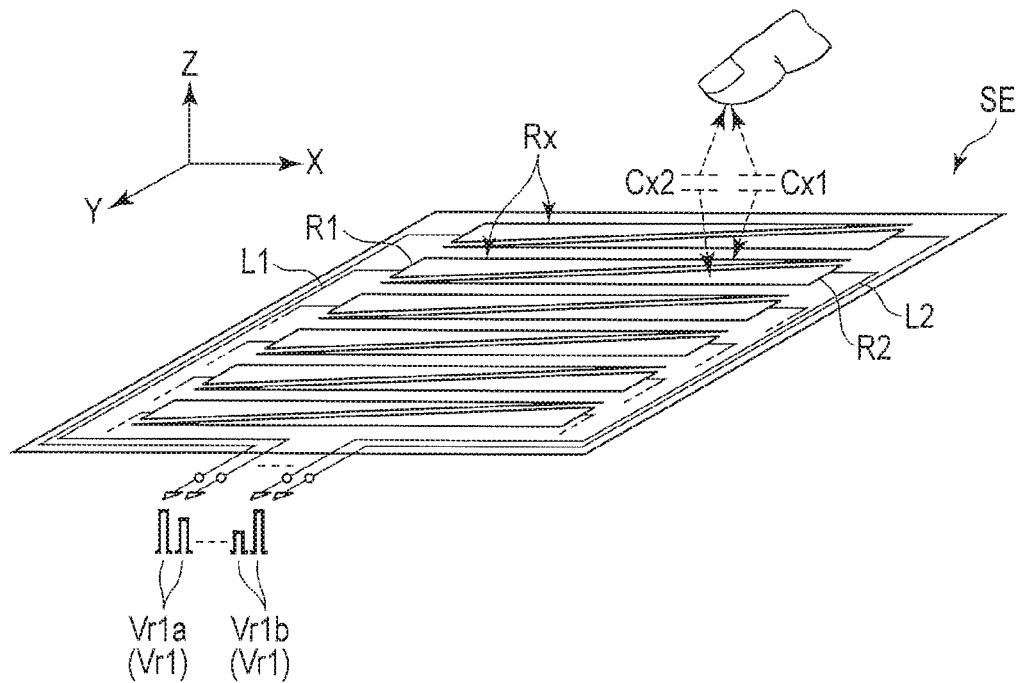
FIG. 9 is a view for explaining, in subsequence to FIG. 8, the principle of the example of the sensing method by the first mode.

As illustrated in FIG. 8 and FIG. 9, in this example, a finger of the user approaches a right area of a detection electrode Rx of a second row in the column direction Y, and capacitive-coupling occurs between this area and the finger. A greater variation in voltage value occurs in the first read signal Vr1$a$ and second read signal Vr1$b$, which were read from the detection electrode Rx of the second row, than in the first read signal Vr1$a$ and second read signal Vr1$b$, which were read from the detection electrodes Rx of the rows other than the second row. It is thus possible to determine that the area opposed to the detection electrode Rx of the second row is the Y coordinate of the input position.

In addition, the area of the second electrode R2, which is opposed to the finger, becomes larger than the area of the first electrode R1, which is opposed to the finger. In other words, a capacitance Cx2, which occurs between the finger and the second electrode R2, becomes greater than a capacitance Cx1, which occurs between the finger and the first electrode R1.

Thus, if the first read signal Vr1$a$ and second read signal Vr1$b$, which were read from the detection electrode Rx of the second row, are compared, a greater variation in voltage value occurs in the second read signal Vr1$b$ than in the first read signal Vr1$a$. Therefore, the right area of the display area DA can be determined to be the X coordinate of the input position.

<Second Mode>

Next, a description is given of the second mode (mutual-capacitive sensing mode) in which second input position information is detected by a combination of the detection electrodes Rx and the common electrode CE. The second mode has a feature that at least a part of the input area is set to be the target of detection, and the X coordinate and Y coordinate of an input position can specifically be detected.

Figure 10:
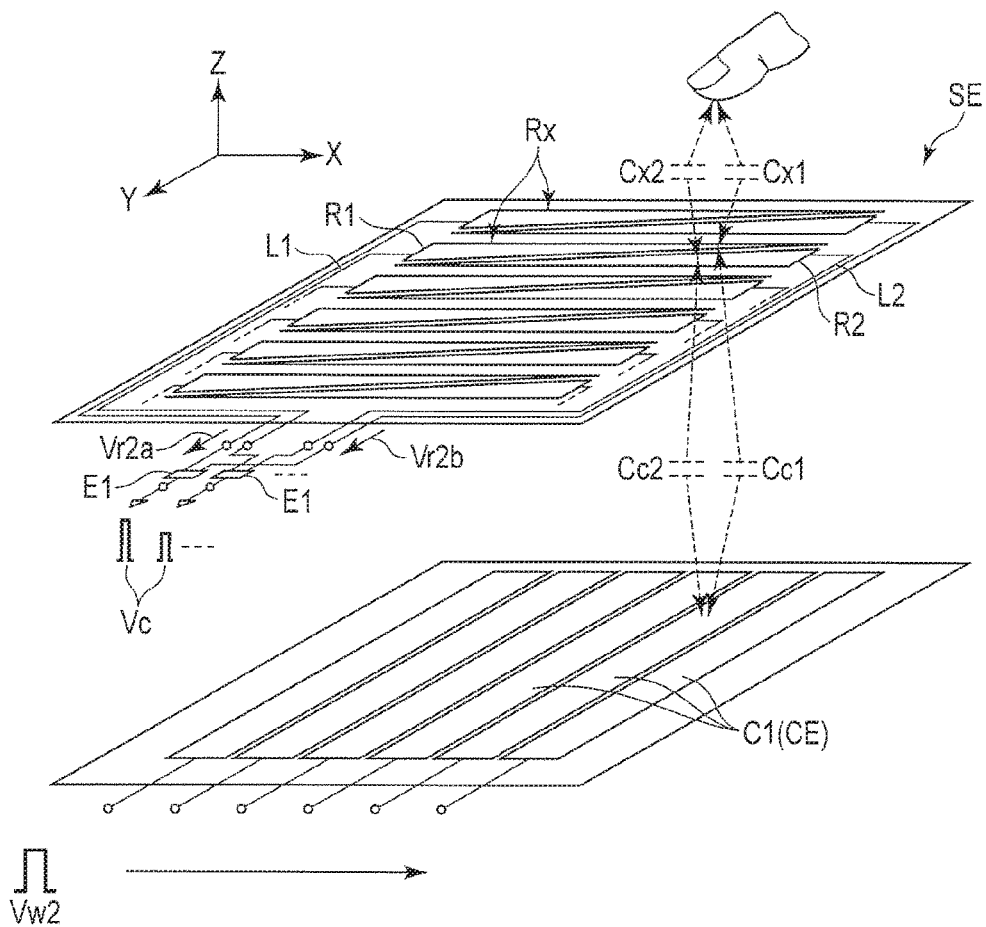
FIG. 10 is a view for explaining the principle of an example of a sensing method by a second mode.

As illustrated in FIG. 10, a capacitance Cc1 exists between the divisional electrode C1 and the first electrode R1, and a capacitance Cc2 exists between the divisional electrode C1 and the second electrode R2. Specifically, the first electrode R1 and second electrode R2 are capacitive-coupled to the divisional electrode C1 (common electrode CE), respectively. In this example, it is assumed that the finger of the user exists in close proximity to a position of an intersection between the detection electrode Rx of the second row and a divisional electrode C1 of a fifth column in the row direction X. Capacitances Cx1 and Cx2 occur due to the finger of the user, which is in close proximity to the detection electrode Rx.

To begin with, the controller writes a pulse-shaped second write signal (sensor driving signal) Vw2 to the common electrode CE, and causes sensor signals to occur between the common electrode CE and the first electrode R1 of each detection electrode Rx, and between the common electrode CE and the second electrode R2 of each detection electrode Rx. Then, the controller reads a third read signal Vr2$a$ indicative of a variation of the sensor signal (e.g. capacitance occurring in the first electrode R1) from the first electrode R1 of at least one detection electrode Rx of the detection electrodes Rx, and reads a fourth read signal Vr2$b$ indicative of a variation of the sensor signal (e.g. capacitance occurring in the second electrode R2) from the second electrode R2 of the at least one detection electrode Rx. Thereafter, the controller bundles the third read signal Vr2$a$ and fourth read signal Vr2$b$, which were read from the identical detection electrode Rx, into one signal. In this example, the third read signal Vr2$a$ and fourth read signal Vr2$b$ are bundled into one signal by using a connection element E1, and a composite signal Vc, in which the third read signal Vr2$a$ and fourth read signal Vr2$b$ are composited, is generated.

In this example, the level of a pulse-shaped composite signal Vc, which is obtained from the detection electrode Rx of the second row at a timing when the second write signal Vw2 is supplied to the divisional electrode C1 of the fifth column, is lower than the levels of pulse-shaped composite signals Vc, which are obtained from the detection electrodes Rx other than the detection electrode Rx of the second row at the same timing, or than the levels of pulse-shaped composite signals Vc, which are obtained from the detection electrodes Rx at other timings.

Thus, the second input position information can be detected, based on the timing when the second write signal Vw2 is supplied to the divisional electrode C1, and the composite signal Vc from each detection electrode Rx.

Here, the detection of the input position information by the second mode can be executed after general input position information of the finger was detected by the first mode. In the above example, in the first mode, the input to the area opposed to the right area of the second-row detection electrode Rx was specified. Thus, the X coordinate and Y coordinate of the input position may specifically be detected in the second mode, with only this area or a vicinity of this area being set to be the target of detection.

For example, the targets of write of the second write signal Vw2 can be limited to the divisional electrodes C1 of the fourth to sixth columns, and the targets of composite signals Vc to be acquired can be limited to the composite signals Vc obtained from the detection electrodes Rx of the first to third rows. Thereby, the X coordinate and Y coordinate of the input position can be finely or exactly be detected in the second mode, with only a specific area, which is a part of the input area, being set to be the target of detection.

Figure 11:
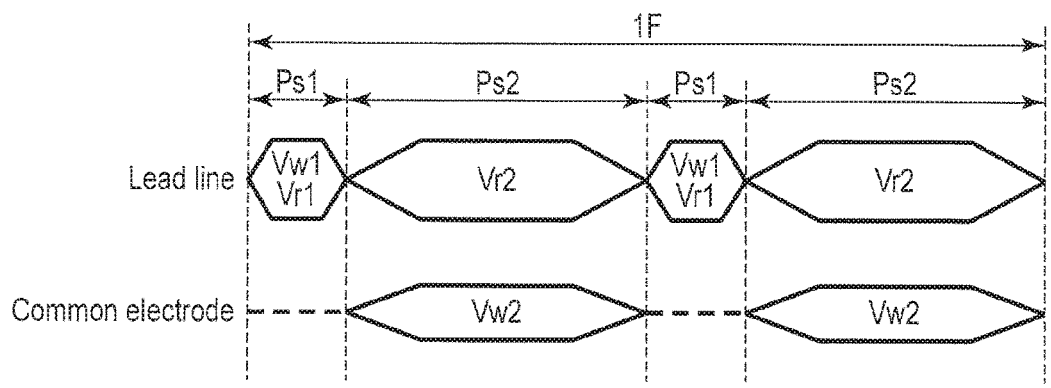
FIG. 11 is a timing chart for explaining a method of driving the sensor-equipped liquid crystal display device, FIG. 11 being a view illustrating write signals Vw1, Vw2, and read signals Vr1 (Vr1a, Vr1b), Vr2 (Vr2a, Vr2b).

As illustrated in FIG. 11, detection by the first mode, which is executed in a first sensing period Ps1, and detection by the second mode, which is executed in a second sensing period Ps2, can repeatedly be executed twice in one frame period (1F).

Here, attention is paid to the detection circuit RC. In the second mode, the detection circuit RC does not set the third read signal Vr2$a$ and fourth read signal Vr2$b$ as targets of detection. By using the connection element E1, the detection circuit RC can set the composite signal Vc as the target of detection in the second mode. If the detection circuit RC includes the same number of detectors as the number of detection electrodes Rx, the detection circuit RC can detect all composite signals Vc. Therefore, by using the connection element E1, the structure of the detection circuit RC can be simplified.

According to the sensor-equipped liquid crystal display device DSP with the above-described structure, the liquid crystal display device DSP includes the liquid crystal display panel PNL including the common electrode CE, the electrostatic capacitance-type sensor SE, and the controller. Each detection electrode Rx of the sensor SE includes the first electrode R1 and second electrode R2. The first electrode R1 is formed in a triangular shape, and has a greater area in the rear part in the row direction X than in the front part in the row direction X. The second electrode R2 is formed in a triangular shape, and has a greater area in the front part in the row direction X than in the rear part in the row direction X.

The controller effects switching between the first mode and the second mode, and controls driving of the common electrode CE and detection electrodes Rx. For example, in the first mode, the controller sets the entirety of the input area to be the target of detection, and detects first input position information by the detection electrode Rx, and thereby the controller can generally detect the X coordinate and Y coordinate of the input position in a short time. Thereby, based on the first input position information, the area of the target of detection can be specified from the input area. Thereafter, in the second mode, the controller sets only the specified area of the input area to be the target of detection, and detects second input position information by the combination of the detection electrodes Rx and common electrode CE, and thereby the controller can finely or exactly detect the X coordinate and Y-coordinate of the input position in the specified area.

In addition, by using the first mode and second mode in combination as described above, the input position can be detected more finely than in the case of adopting only the first mode, and the input position can be detected more quickly than in the case of adopting only the second mode.

In the present embodiment, the first write signal Vw1 is not written to the single detection electrode Rx. As described above, the detection electrode Rx is formed of the divided first electrode R1 and second electrode R2. The first write signal Vw1 is independently written to the first electrode R1 and second electrode R2. Each of the area of the first electrode R1 and the area of the second electrode R2 is about half the area of the detection electrode Rx, and is small. Since the parasitic capacitance of the first electrode R1 and second electrode R2 can be reduced, the load of the first electrode R1 and the load of the second electrode R2 can be decreased, and the time constant of the first electrode R1 and second electrode R2 can be decreased. Thereby, since the first electrode R1 and second electrode R2 with the small time constant can be used, it is possible to contribute accordingly to reducing the time that is needed for sensing.

From the above, it is possible to obtain the sensor-equipped liquid crystal display device DSP which can detect the first input position information by the detection electrodes Rx, and to detect the second input position information by the combination of the detection electrodes Rx and common electrode CE.

Modification 1 of the First Embodiment

Next, a sensor-equipped liquid crystal display device DSP according to Modification 1 of the above-described first embodiment is described in detail. The liquid crystal display device DSP according to Modification 1 is constructed similarly with the liquid crystal display device DSP according to the first embodiment, except that connection elements E2 are used. In Modification 1, the detection of coordinates of an input position is more generally executed, but the structure of the detection circuit RC can be made simpler.

As illustrated in FIG. 12, in the first mode, the controller bundles two first read signals Vr1$a$, which were read from two detection electrodes Rx located continuous in the column direction Y among the detection electrodes Rx, into one signal, and also bundles two second read signals Vr1$b$, which were read from the two detection electrodes Rx, into one signal. In this example, the two first read signals Vr1$a$ are bundled into one signal by using the connection element E2, and a composite signal Vd, in which the two first read signals Vr1$a$ are composited, is generated. Further, the two second read signals Vr1$b$ are bundled into one signal by using the connection element E2, and a composite signal Vd, in which the two second read signals Vr1$b$ are composited, is generated.

Here, attention is paid to the detection circuit RC. In the first mode, the detection circuit RC does not set the first read signal Vr1$a$ and second read signal Vr1$b$ as targets of detection. By using the connection element E2, the detection circuit RC can set the composite signal Vd as the target of detection in the first mode. If the detection circuit RC includes the same number of detectors as the number of detection electrodes Rx, the detection circuit RC can detect all composite signals Vd. Therefore, by using the connection element E2, the structure of the detection circuit RC can be simplified.

In the meantime, in the first mode, two or more first read signals Vr1$a$, which were read from two or more detection electrodes Rx located continuous in the column direction Y among the detection electrodes Rx, may be bundled into one signal, and also two or more second read signals Vr1$b$, which were read from the two or more detection electrodes Rx, may be bundled into one signal.

In other words, two or more first read signals Vr1$a$, which were read from two or more first electrodes R1 may be composited into one signal, or two or more second read signals Vr1$b$, which were read from two or more second electrodes R2, may be bundled into one signal.

If each of one first electrode R1 and one second electrode R2 is made to function as a single detection electrode, finer detection can be made. On the other hand, if a plurality of first electrodes R1 are made to function as a single detection electrode, or if a plurality of second electrodes R2 are made to function as a single detection electrode, the detection time can be shortened. Alternatively, if a plurality of first electrodes R1 are made to function as a single detection electrode, or if a plurality of second electrodes R2 are made to function as a single detection electrode, the load on the detection circuit RC can be reduced, and the structure of the detection circuit RC can be made simpler.

Modification 2 of the First Embodiment

Next, a sensor-equipped liquid crystal display device DSP according to Modification 2 of the above-described first embodiment is described in detail. The liquid crystal display device DSP according to Modification 2 is constructed similarly with the liquid crystal display device DSP according to the first embodiment, except for the arrangement of the first electrodes R1 and second electrodes R2.

Figure 13:
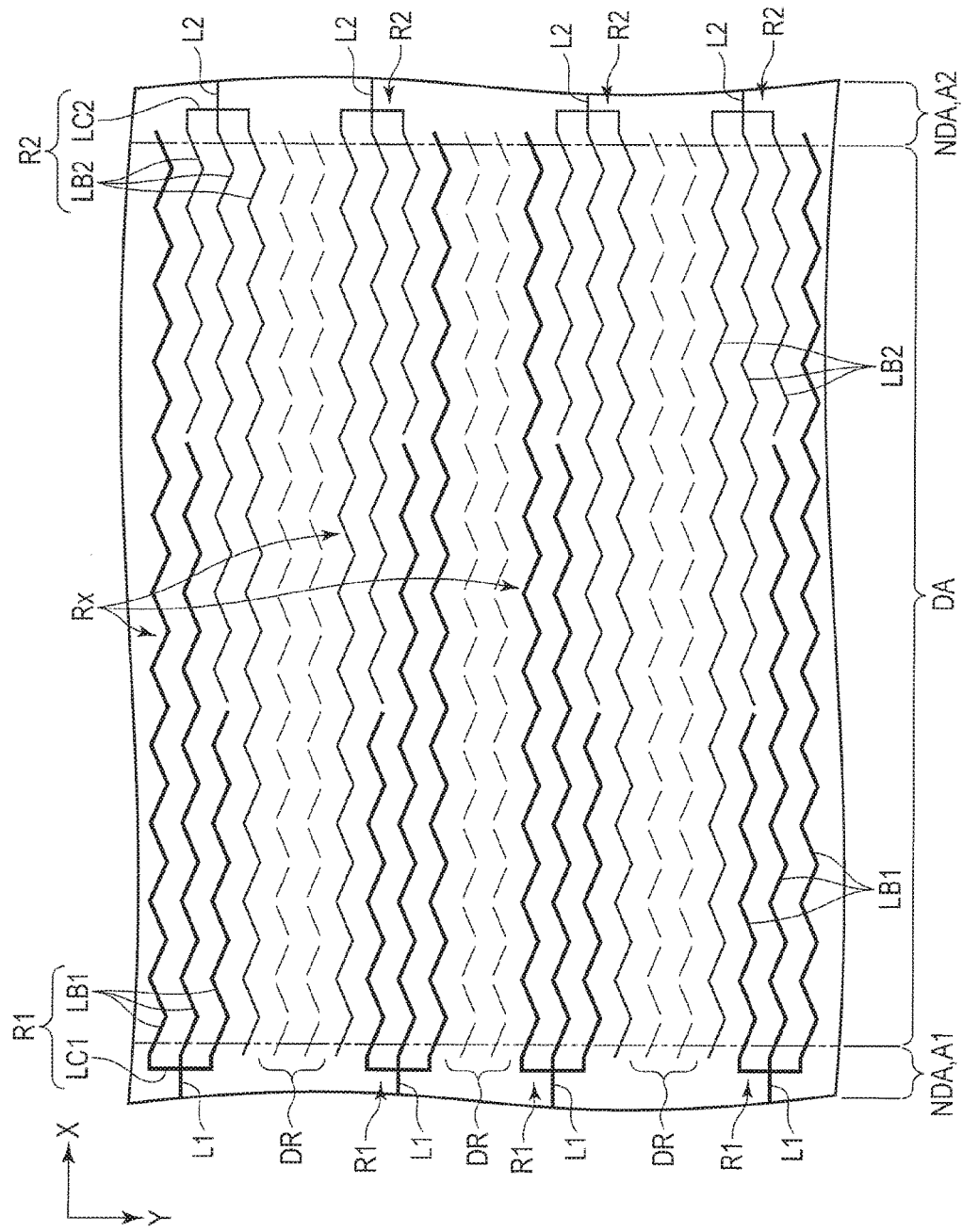
FIG. 13 is a plan view which schematically illustrates a part of the sensor in enlarged scale, this part of the sensor being different from the part of the sensor shown in FIG. 6.

As illustrated in FIG. 13, two first electrodes R1 and two second electrodes R2 may be alternately arranged in the column direction Y. In this example, in a detection electrode Rx of an odd-numbered row, the first electrode R1 is located on the upper side in plan view, and the second electrode R2 is located on the lower side in plan view. On the other hand, in a detection electrode Rx of an even-numbered row, the second electrode R2 is located on the upper side in plan view, and the first electrode R1 is located on the lower side in plan view. In Modification 2, an example is illustrated in which the detection lines LB1 of the first electrode R1 and the detection lines LB2 of the second electrode R2 are disposed on the upper side and lower side in plan view. This up-and-down relationship may be alternate, or may be not alternate but asymmetric. However, even if the up-and-down relationship is asymmetric, it is preferable that the area of the first electrode R1 and the area of the two second electrodes R2 are equal.

Modification 3 of the First Embodiment

Next, a sensor-equipped liquid crystal display device DSP according to Modification 3 of the above-described first embodiment is described in detail. The liquid crystal display device DSP according to Modification 3 is constructed similarly with the liquid crystal display device DSP according to the first embodiment, except for the structure of the first electrodes R1 and second electrodes R2.

As illustrated in FIG. 14, in each detection electrode Rx, the first electrode R1 and second electrode R2 may be divided in the row direction X. Here, in a detection electrode Rx of an odd-numbered row, the detection lines LB1 are located on $\frac{2}{3}$ (the left area and middle area) of the display area DA in the row direction X, and the detection lines LB2 are located on ⅓ (the right area) of the display area DA in the row direction X. On the other hand, in a detection electrode Rx of an even-numbered row, the detection lines LB1 are located on ⅓ (the left area) of the display area DA in the row direction X, and the detection lines LB2 are located on ⅔ (the right area and middle area) of the display area DA in the row direction X.

Modification 4 of the First Embodiment

Next, a sensor-equipped liquid crystal display device DSP according to Modification 4 of the above-described first embodiment is described in detail. The liquid crystal display device DSP according to Modification 4 is constructed similarly with the liquid crystal display device DSP according to the first embodiment, except for the structure of the detection electrodes Rx, common electrode CE, and lead lines L1 and L2.

Figure 15:
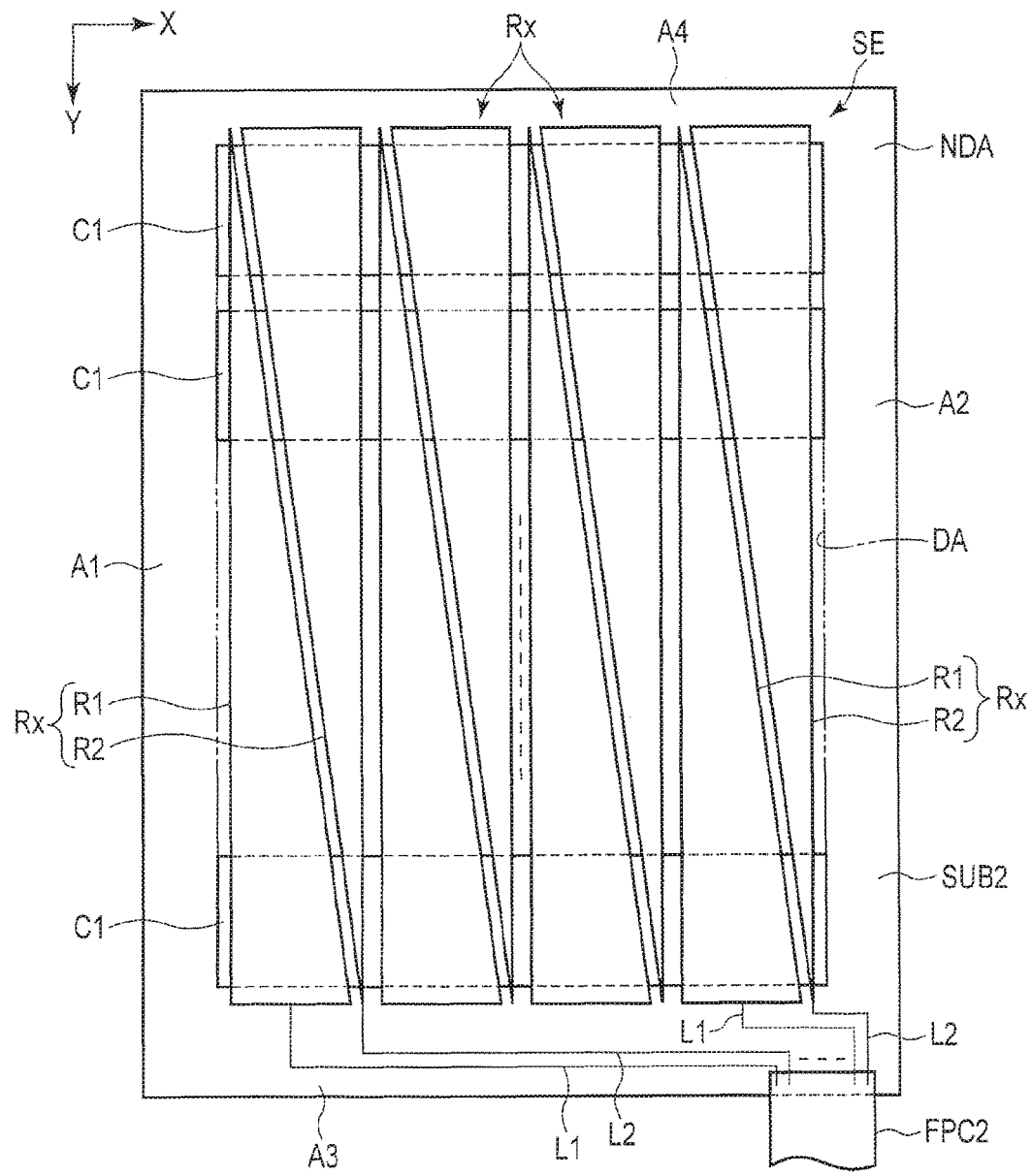
FIG. 15 is a plan view which schematically illustrates a part of the sensor in enlarged scale, this part of the sensor being different from the parts of the sensor shown in FIG. 6, FIG. 13 and FIG. 14.

As illustrated in FIG. 15, the liquid crystal display device DSP according to Modification 4 differs from the liquid crystal display device DSP according to the first embodiment, in that each divisional electrode C1 of the common electrode CE extends in the row direction X and the detection electrodes Rx extend substantially in the column direction Y. In this Modification 4, when the upper left of the liquid crystal display panel PNL is set as a reference point, the negative direction of the column direction Y is the first direction, and the positive direction of the row direction X is the second direction.

In addition, in Modification 4, the first electrodes R1 and second electrodes R2 are formed of a transparent, electrically conductive layer which utilizes a transparent, electrically conductive material such as ITO, IZO or ZnO. The first electrode R1 has a greater area in the front part than in the rear part in the column direction Y. The first electrode R1 includes an end portion projecting rearward in the column direction Y, and is formed in a triangular shape. The second electrode R2 has a greater area in the rear part than in the front part in the column direction Y. The second electrode R2 includes an end portion projecting forward in the column direction Y, and is formed in a triangular shape.

The lead lines L1 and L2 are metal wires, and are disposed in the third area A3 of the second substrate SUB2.

In the meantime, in FIG. 15, the width of the first electrode R1 becomes larger toward the connection portion to the lead line L1, and becomes smaller away from the connection portion. Incidentally, the variation in width may be continuous or may be stepwise. In addition, the relationship between the second electrode R2 and lead line L2 is reverse to the relationship between the first electrode R1 and lead line L1. The width of the second electrode R2 varies in accordance with the distance from the connection portion to the lead line L2. In FIG. 15, the width of the second electrode R2 becomes smaller toward the connection portion to the lead line L2, and becomes larger away from the connection portion.

Second Embodiment

Next, a liquid crystal display device DSP according to a second embodiment is described. The liquid crystal display device DSP of this embodiment is constructed similarly with the liquid crystal display device DSP according to the above-described first embodiment. Here, a method of driving the liquid crystal display device DSP is described in detail.

Figure 16:
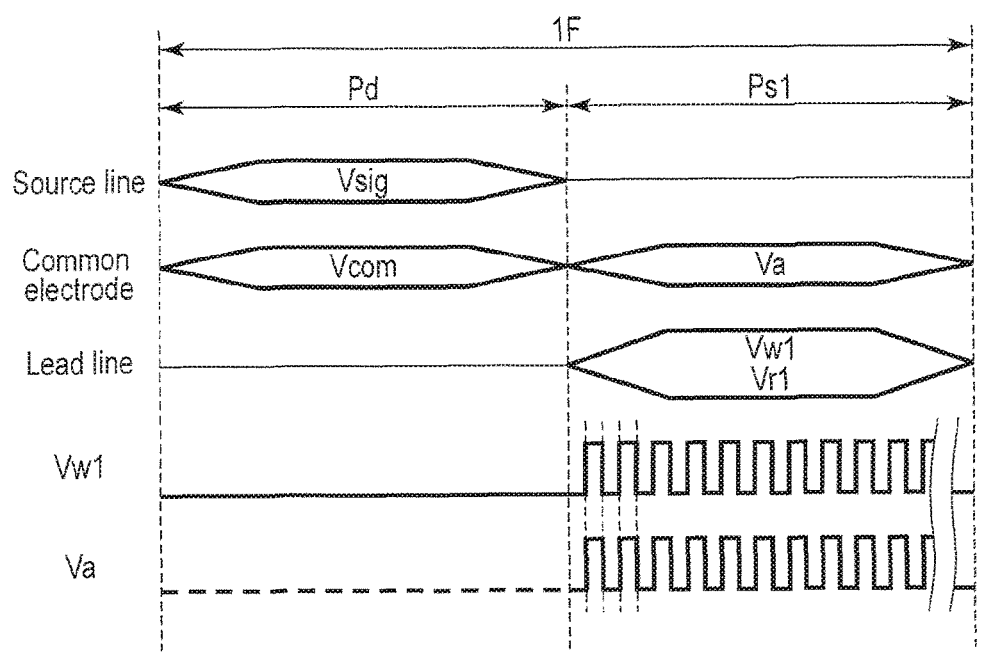
FIG. 16 is a timing chart for explaining a method of driving a sensor-equipped liquid crystal display device according to a second embodiment, FIG. 16 being a view illustrating a video signal, a common voltage, a potential adjustment signal, a first write signal, a first read signal and a second read signal.

As illustrated in FIG. 16, in an arbitrary 1 frame (1F) period, a display operation is executed in a display operation period Pd that is a first half of the 1F period, and an input position information detection operation by the first mode is executed in a first sensing period Ps1 that is a second half of the 1F period. The first sensing period Ps1 is, for example, a blanking period. As the blanking period, for instance, a horizontal blanking period and a vertical blanking period can be enumerated.

In the display operation period Pd, a control signal is delivered to the gate line G from the gate line driving circuit GD, a video signal Vsig is delivered to the source line S from the source line driving circuit SD, and a common voltage Vcom is applied to the common electrode CE (divisional electrodes C1) from the common electrode driving circuit CD. Thereby, the liquid crystal display panel PNL is driven.

In the first sensing period Ps1, the controller writes a potential adjustment signal Va, which is identical to a first write signal Vw1 that is written in the detection electrode Rx (first electrode R1, second electrode R2), in the common electrode CE (divisional electrode C1) in synchronism with the first write signal Vw1. Incidentally, the first write signal Vw1 and the potential adjustment signal Va are pulse signals which are identical with respect to the phase, low-level potential, high-level potential and period.

For example, the control module CM can deliver synchronization signals to the driver IC chip IC1 and driver IC chip IC2, and can synchronize the first write signal Vw1 and potential adjustment signal Va. Alternatively, the driver IC chip IC2 can deliver a pulse-shaped timing signal indicative of a driving (scanning) timing of the sensor SE to the driver IC chip IC1, and can synchronize the first write signal Vw1 and potential adjustment signal Va.

In the second embodiment with the above-described structure, too, the same advantageous effects as obtained in the first embodiment can be obtained.

In the first sensing period Ps1, the potential adjustment signal Va, which has a waveform identical to the waveform of the first write signal Vw1, is written in the common electrode CE in synchronism with the first write signal Vw1. Thereby, since a period (Ps1) can be provided for eliminating a parasitic capacitance occurring between the detection electrode Rx and common electrode CE, the sensor SE can be better driven in the first mode, and the precision of detection of the first input position information can further be enhanced.

Third Embodiment

Next, a liquid crystal display device DSP according to a third embodiment is described.

Figure 17:
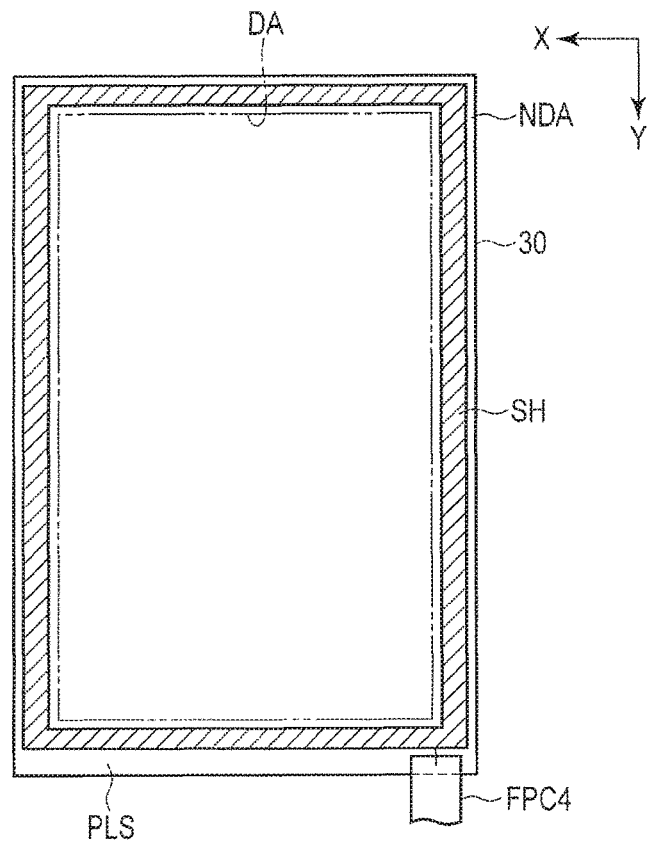
FIG. 17 is a schematic plan view illustrating a part of a sensor-equipped liquid crystal display device according to a third embodiment, FIG. 17 illustrating a third insulative substrate, a peripheral light-shield layer, a shield electrode, and a flexible wiring board.
Figure 18:
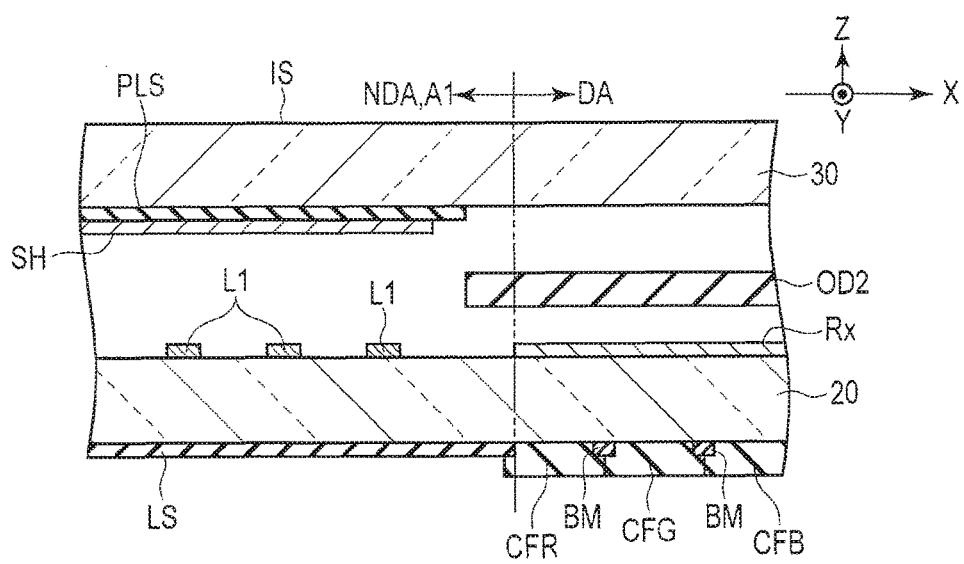
FIG. 18 is a cross-sectional view which schematically illustrates the structure of a part of a sensor-equipped liquid crystal display device according to the third embodiment.

As illustrated in FIG. 17 and FIG. 18, the liquid crystal display device DSP further includes a third insulative substrate 30 which is different from the first insulative substrate 10 and second insulative substrate 20. The third insulative substrate 30 is a substrate with light transmissivity, such as a glass substrate or a resin substrate. In this embodiment, the third insulative substrate 30 is formed of glass, and functions as a cover glass which is located on the surface of the liquid crystal display device DSP. Here, the input surface IS of the liquid crystal display device DSP is the surface of the third insulative substrate 30. The third insulative substrate 30 is located outside the liquid crystal display panel PNL, and is opposed to the display area DA and non-display area NDA of the liquid crystal display panel PNL.

On the third insulative substrate 30, a peripheral light-shield layer PLS and a shield electrode SH are formed. The peripheral light-shield layer PLS is formed in a rectangular frame shape, and is opposed to the non-display area NDA. The peripheral light-shield layer PLS is formed of, for example, a black resin. The shield electrode SH is opposed to the non-display area NDA. The size of the shield electrode SH is less than the size of the peripheral light-shield layer PLS. The shield electrode SH is located between the lead lines L1, L2 and the peripheral light-shield layer PLS. In this embodiment, the shield electrode SH is formed in a rectangular frame shape. However, the shape of the shield electrode SH is variously modifiable, and it should suffice if the shield electrode SH is formed at a position opposed to the lead lines L1, L2. The shield electrode SH can shield, for example, capacitive-coupling which occurs between the finger and lead line L1, L2.

The shield electrode SH is connected to the controller via the flexible wiring board FPC4, etc., and the driving of the shield electrode SH is controlled by the controller. The controller, which controls the driving of the shield electrode SH, can be exemplified by the control module CM or driver IC chip IC2. In the first mode, the controller writes a potential adjustment signal Vb, which has a waveform identical to the waveform of the first write signal Vw1, to the shield electrode SH in synchronism with the first write signal Vw1.

Here, an example of the driving of the shield electrode SH is described.

As illustrated in FIG. 19, in the first sensing period Ps1, the controller writes a potential adjustment signal Vb, which is identical to a first write signal Vw1 that is written in the detection electrode Rx and lead line L1, L2, to the shield electrode SH in synchronism with the first write signal Vw1. Incidentally, the first write signal Vw1 and the potential adjustment signal Vb are pulse signals which are identical with respect to the phase, low-level potential, high-level potential and period.

From the above, since a period (Ps1) can be provided for eliminating a parasitic capacitance occurring between the lead line L1, L2 and shield electrode SH, the sensor SE can be better driven in the first mode, and the precision of detection of the first input position information can further be enhanced. In the meantime, when the potential adjustment signal Vb is written in the shield electrode SH, the above-described potential adjustment signal Va may be written to the common electrode CE. Thereby, the precision of detection of the first input position information can further be enhanced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the display operation period Pd, the controller may apply a voltage between the common electrode CE and pixel electrode PE, execute switching to the first mode, and control the driving of the detection electrodes Rx. In this case, in the first mode, the potential of the low level of the first write signal Vw1, which is a pulse signal, may be identical to the potential (common voltage Vcom) of the common electrode CE. Thereby, a parasitic capacitance (load capacitance) occurring between the detection electrode Rx and common electrode CE can be reduced.

The shape of each of the first electrode R1 and second electrode R2 is not limited to a triangular shape or a band shape, and is variously modifiable. It should suffice if the first electrode R1 has a greater area in the rear part than in the front part in the first direction in which the detection electrode Rx extends. It should suffice if the second electrode R2 has a greater area in the front part than in the rear part in the first direction in which the detection electrode Rx extends.

In other words, it should suffice if each of the first electrode R1 and second electrode R2 of the detection electrode Rx has a gradient in width in the first direction, and if the gradient in width of the first electrode R1 and the gradient in width of the second electrode R2 are inclined in opposite directions.

When the controller effects switching to either the first mode (self-capacitive sensing mode) or the second mode (mutual-capacitive sensing mode), the controller may alternately switch the first mode and second mode, or may effect switching to the first mode or the second mode in units of a plurality of times. By interpolating the data obtained in the first mode and second mode, the report rate of touches can be improved.

In the above-described embodiments, as the display device, liquid crystal display devices have been disclosed by way of example. However, the above-described embodiments are applicable to all kinds of flat-panel display devices, such as organic EL (electroluminescent) display devices, other self-luminous display devices, electronic paper-type display devices including electrophoresis elements, etc. Needless to say, the above-described embodiments are applicable to display devices ranging from small/middle-sided display devices to large-sized display devices, without particular restrictions.

The following relate to modes of the invention disclosed.

[C1] relates to a sensor-equipped display device comprising:
a display panel comprising a common electrode;
a sensor comprising a plurality of detection electrodes extending in a first direction and arranged in a second direction crossing the first direction,
each of the detection electrodes including a first electrode and a second electrode which are opposed to the common electrode, are divided and extend in the first direction,
the first electrode including a greater area in a rear part than in a front part in the first direction in the detection electrode, and
the second electrode including a greater area in the front part than in the rear part in the first direction in the detection electrode; and
a controller configured to effect switching to either a first mode or a second mode, and to control driving of the common electrode and the detection electrodes,
wherein
the controller is configured to write, in the first mode, a first write signal to the first electrode and the second electrode of each of the detection electrodes, to read from the first electrode a first read signal indicative of a variation of the first write signal, and to read from the second electrode a second read signal indicative of a variation of the first write signal, and
the controller is configured to write, in the second mode, a second write signal to the common electrode, to cause a sensor signal to occur between the common electrode and the first electrode of each detection electrode and between the common electrode and the second electrode of each detection electrode, to read a third read signal indicative of a variation of the sensor signal from the first electrode of at least one detection electrode of the detection electrodes, to read a fourth read signal indicative of a variation of the sensor signal from the second electrode of the at least one detection electrode, and to bundle the third read signal and the fourth read signal, which were read from the detection electrode that is identical, into one signal.

[C2] relates to the sensor-equipped display device according to [C1], wherein
the first electrode includes an end portion projecting forward in the first direction, and is formed in a triangular shape, and
the second electrode includes an end portion projecting rearward in the first direction, and is formed in a triangular shape.

[C3] invention relates to the sensor-equipped display device according to [C1], wherein
the first electrode and the second electrode are triangular electrodes which are disposed in point symmetry.

[C4] relates to the sensor-equipped display device according to [C1], wherein
the common electrode includes a plurality of divisional electrodes which extend in the second direction and are divided.

[C5] relates to the sensor-equipped display device according to [C1], wherein
the controller is configured to bundle, in the first mode, two or more first read signals, which were read from two or more detection electrodes located continuous in the second direction among the detection electrodes, into one signal, and to bundle two or more second read signals, which were read from the two or more detection electrodes, into one signal.

[C6] relates to the sensor-equipped display device according to [C1], wherein
the first write signal is a pulse signal, and
a potential of a low level of the pulse signal is, in the first mode, identical to a potential of the common electrode.

[C7] relates to the sensor-equipped display device according to [C1], wherein
the controller is configured to write, in the first mode, a potential adjustment signal, which includes a waveform identical to a waveform of the first write signal, to the common electrode in synchronism with the first write signal.

[C8] relates to the sensor-equipped display device according to [C1], further comprising:
an insulative substrate located outside the display panel, and opposed to a display area and a non-display area outside the display area of the display panel; and
a shield electrode provided on the insulative substrate and opposed to the non-display area, driving of the shield electrode being controlled by the controller,
wherein
the sensor further includes a plurality of lead lines connected to the first electrode and the second electrode and opposed to the non-display area, and
the controller is configured to write, in the first mode, a potential adjustment signal, which includes a waveform identical to a waveform of the first write signal, to the shield electrode in synchronism with the first write signal.

[C9] relates to the sensor-equipped display device according to [C8], further comprising:
a peripheral light-shield layer provided on the insulative substrate and opposed to the non-display area,
wherein the shield electrode is located between the lead lines and the peripheral light-shield layer.

[C10] relates to the sensor-equipped display device according to [C1], wherein
the display panel includes a pixel electrode, and
the controller is configured to apply, in a display operation period, a voltage between the common electrode and the pixel electrode, to effect switching to the first mode, and to control the driving of the detection electrodes.

[C11] relates to a sensor-equipped display device comprising:
a display panel comprising a common electrode;
a sensor comprising a plurality of detection electrodes extending in a first direction and arranged in a second direction crossing the first direction,
each of the detection electrodes including a first electrode and a second electrode which are opposed to the common electrode, are divided and extend in the first direction,
each of the first electrode and the second electrode including a gradient in width in the first direction in the detection electrode,
the gradient in width of the first electrode and the gradient in width of the second electrode being inclined in opposite directions; and
a controller configured to effect switching to either a first mode or a second mode, and to control driving of the common electrode and the detection electrodes,
wherein
the controller is configured to write, in the first mode, a first write signal to the first electrode and the second electrode of each of the detection electrodes, to read from the first electrode a first read signal indicative of a variation of the first write signal, and to read from the second electrode a second read signal indicative of a variation of the first write signal, and
the controller is configured to write, in the second mode, a second write signal to the common electrode, to cause a sensor signal to occur between the common electrode and the first electrode of each detection electrode and between the common electrode and the second electrode of each detection electrode, to read a third read signal indicative of a variation of the sensor signal from the first electrode of at least one detection electrode of the detection electrodes, to read a fourth read signal indicative of a variation of the sensor signal from the second electrode of the at least one detection electrode, and to bundle the third read signal and the fourth read signal, which were read from the detection electrode that is identical, into one signal.

[C12] relates to the sensor-equipped display device according to [C11], wherein
the first electrode and the second electrode are triangular electrodes which are disposed in point symmetry.

[C13] relates to the sensor-equipped display device according to [C11], wherein
the common electrode includes a plurality of divisional electrodes which extend in the second direction and are divided.

[C14] relates to the sensor-equipped display device according to [C11], wherein
the controller is configured to bundle, in the first mode, two or more first read signals, which were read from two or more detection electrodes located continuous in the second direction among the detection electrodes, into one signal, and to bundle two or more second read signals, which were read from the two or more detection electrodes, into one signal.

[C15] relates to the sensor-equipped display device according to [C11], wherein
the first write signal is a pulse signal, and
a potential of a low level of the pulse signal is, in the first mode, identical to a potential of the common electrode.

[C16] relates to the sensor-equipped display device according to [C11], wherein
the controller is configured to write, in the first mode, a potential adjustment signal, which includes a waveform identical to a waveform of the first write signal, to the common electrode in synchronism with the first write signal.

[C17] relates to the sensor-equipped display device according to [C11], further comprising:
an insulative substrate located outside the display panel, and opposed to a display area and a non-display area outside the display area of the display panel; and
a shield electrode provided on the insulative substrate and opposed to the non-display area, driving of the shield electrode being controlled by the controller,
wherein
the sensor further includes a plurality of lead lines connected to the first electrode and the second electrode and opposed to the non-display area, and
the controller is configured to write, in the first mode, a potential adjustment signal, which includes a waveform identical to a waveform of the first write signal, to the shield electrode in synchronism with the first write signal.

[C18] relates to the sensor-equipped display device according to [C17], further comprising:
a peripheral light-shield layer provided on the insulative substrate and opposed to the non-display area,
wherein the shield electrode is located between the lead lines and the peripheral light-shield layer.

[C19] relates to the sensor-equipped display device according to [C11], wherein
the display panel includes a pixel electrode, and
the controller is configured to apply, in a display operation period, a voltage between the common electrode and the pixel electrode, to effect switching to the first mode, and to control the driving of the detection electrodes.

[C20] relates to a sensor-equipped display device comprising:
a display panel comprising a common electrode; and
a sensor comprising a plurality of detection electrodes extending in a first direction and arranged in a second direction crossing the first direction, and a plurality of lead lines,
each of the detection electrodes including a first electrode and a second electrode which are opposed to the common electrode, are divided and extend in the first direction,
the first electrode including a greater area in a rear part than in a front part in the first direction in the detection electrode,
the second electrode including a greater area in the front part than in the rear part in the first direction in the detection electrode, and
the lead lines being connected to the first electrode and the second electrode in a one-to-one correspondence.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A sensor-equipped display device comprising:
a display panel comprising a common electrode;
a sensor comprising a plurality of detection electrodes extending in a first direction and arranged in a second direction crossing the first direction,
each of the detection electrodes including a first electrode and a second electrode which are opposed to the common electrode, are divided and extend in the first direction,
each of the first electrode and the second electrode including a gradient in width in the first direction in the detection electrode,
the gradient in width of the first electrode and the gradient in width of the second electrode being inclined in opposite directions; and
a controller configured to effect switching to either a first mode or a second mode, and to control driving of the common electrode and the detection electrodes,
wherein
the sensor further comprises a dummy electrode disposed between neighboring detection electrodes.

2. The sensor-equipped display device according to claim 1, wherein
the first electrode and the second electrode are triangular electrodes which are disposed in point symmetry.

3. The sensor-equipped display device according to claim 1, wherein
the common electrode includes a plurality of divisional electrodes which extend in the second direction and are divided.

4. The sensor-equipped display device according to claim 1, wherein
the controller is configured to bundle, in the first mode, two or more first read signals, which were read from two or more detection electrodes located continuous in the second direction among the detection electrodes, into one signal, and to bundle two or more second read signals, which were read from the two or more detection electrodes, into one signal.

5. The sensor-equipped display device according to claim 1, wherein
the first write signal is a pulse signal, and
a potential of a low level of the pulse signal is, in the first mode, identical to a potential of the common electrode.

6. The sensor-equipped display device according to claim 1, wherein
the controller is configured to write, in the first mode, a potential adjustment signal, which includes a waveform identical to a waveform of the first write signal, to the common electrode in synchronism with the first write signal.

7. The sensor-equipped display device according to claim 1, further comprising:
an insulative substrate located outside the display panel, and opposed to a display area and a non-display area outside the display area of the display panel; and a shield electrode provided on the insulative substrate and opposed to the non-display area, driving of the shield electrode being controlled by the controller, wherein the sensor further includes a plurality of lead lines connected to the first electrode and the second electrode and opposed to the non-display area, and the controller is configured to write, in the first mode, a potential adjustment signal, which includes a waveform identical to a waveform of the first write signal, to the shield electrode in synchronism with the first write signal.

8. The sensor-equipped display device according to claim 7, further comprising:

a peripheral light-shield layer provided on the insulative substrate and opposed to the non-display area, wherein the shield electrode is located between the lead lines and the peripheral light-shield layer.

9. The sensor-equipped display device according to claim 1, wherein the display panel includes a pixel electrode, and the controller is configured to apply, in a display operation period, a voltage between the common electrode and the pixel electrode, to effect switching to the first mode, and to control the driving of the detection electrodes.

10. The sensor-equipped display device according to claim 1, wherein each of the detection electrodes includes a plurality of detection lines, and the dummy electrode is formed of a plurality of dummy lines which are disposed in parallel to the detection lines, and are disposed substantially at regular intervals.

11. The sensor-equipped display device according to claim 1, wherein the dummy electrode is set in an electrically floating state.

* * * * *